Aug. 11, 1959   J. F. CELLA   2,898,715
BOTTLE PACKAGING MACHINE
Filed Jan. 2, 1957   13 Sheets-Sheet 1

INVENTOR.
JOSEPH F. CELLA
BY
Burton & Parker
ATTORNEYS

Aug. 11, 1959     J. F. CELLA     2,898,715
BOTTLE PACKAGING MACHINE
Filed Jan. 2, 1957     13 Sheets-Sheet 4

INVENTOR.
JOSEPH F. CELLA
BY
Burton & Parker
ATTORNEYS

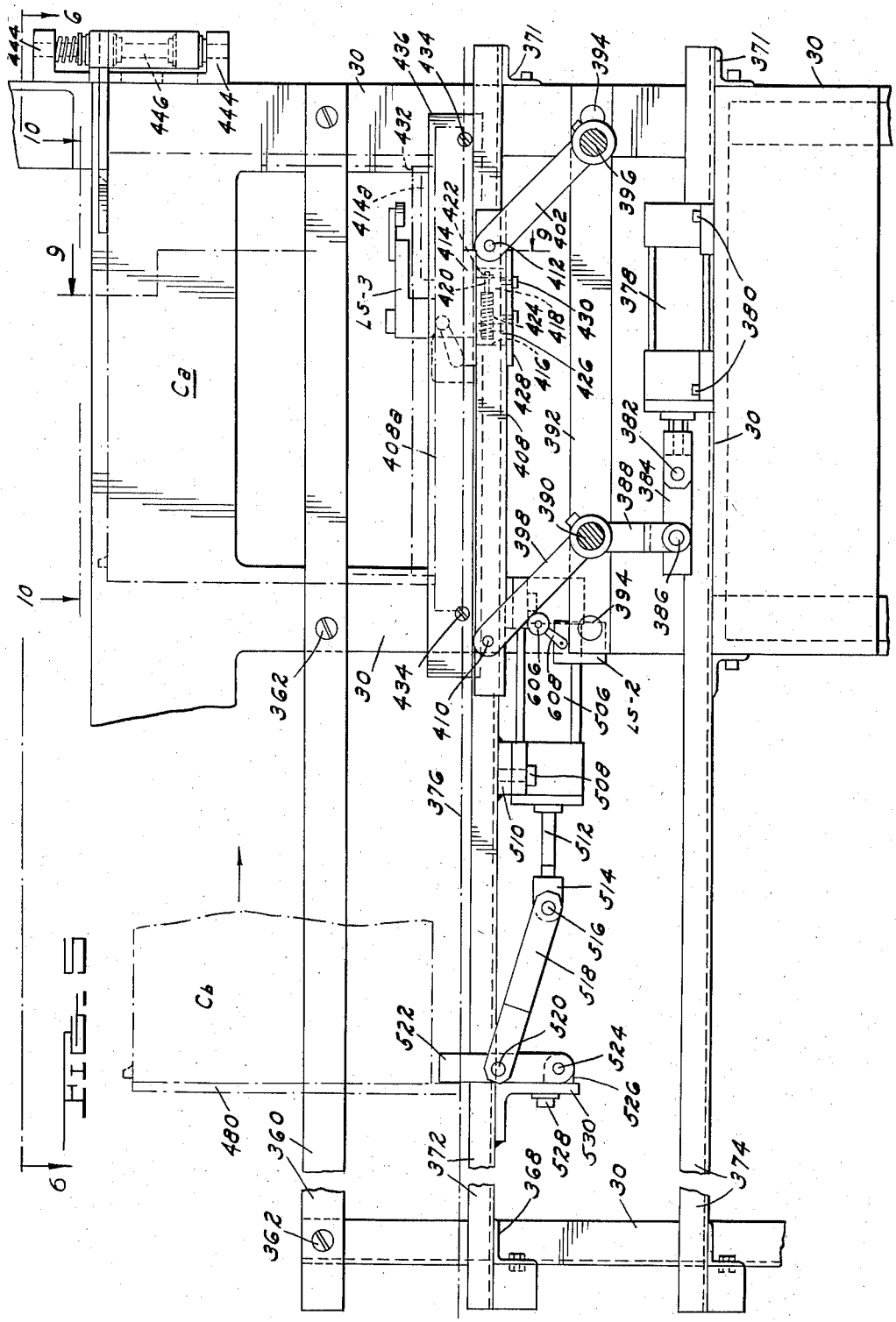

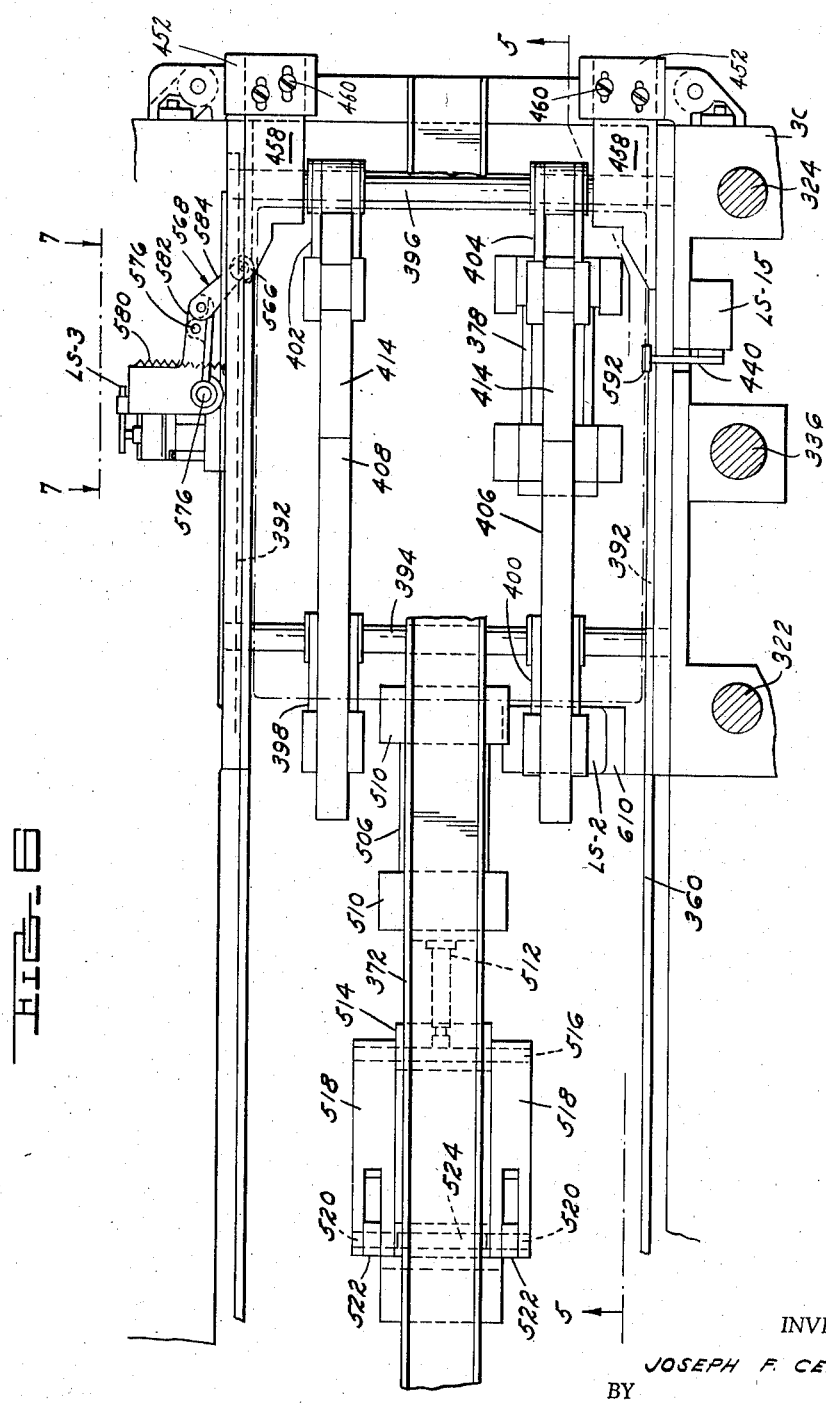

Aug. 11, 1959

J. F. CELLA 2,898,715

BOTTLE PACKAGING MACHINE

Filed Jan. 2, 1957

INVENTOR.
JOSEPH F. CELLA
BY
Burton & Parker
ATTORNEYS

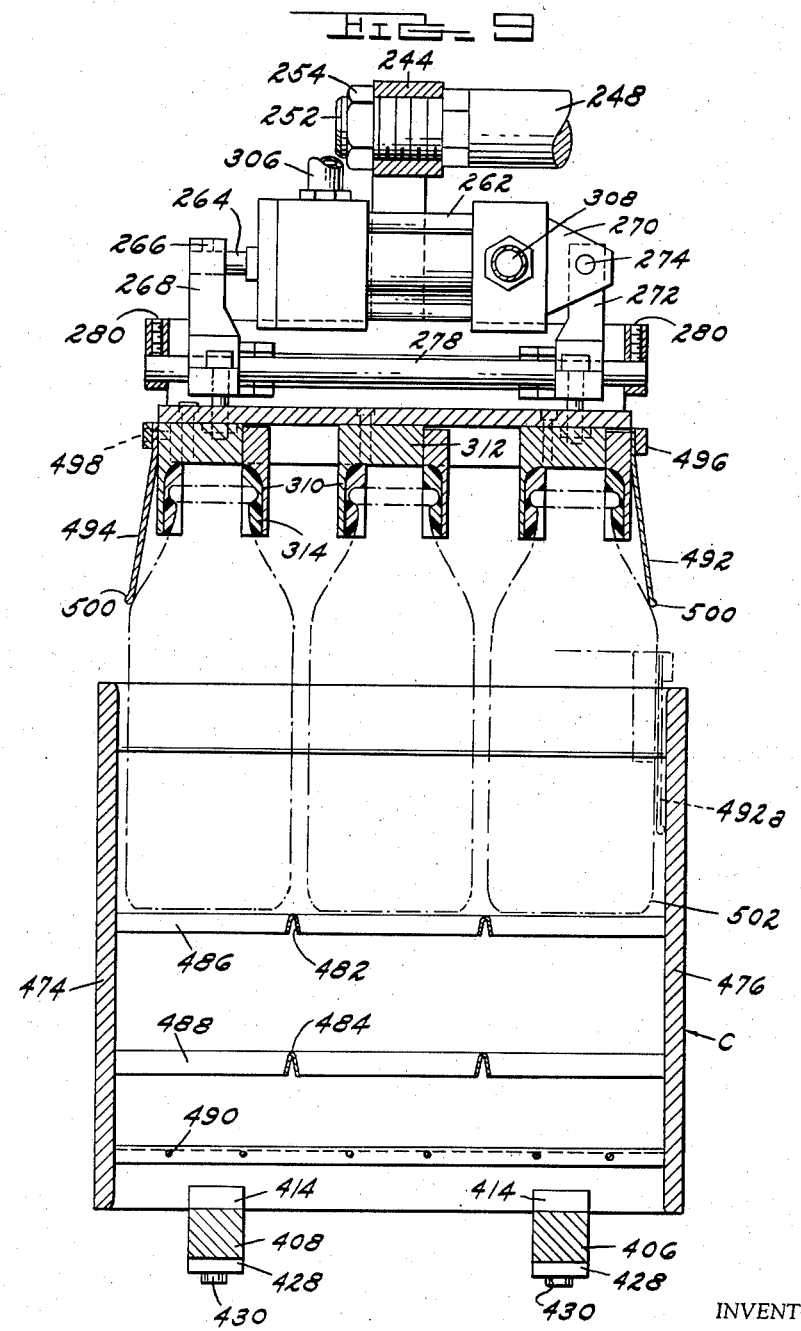

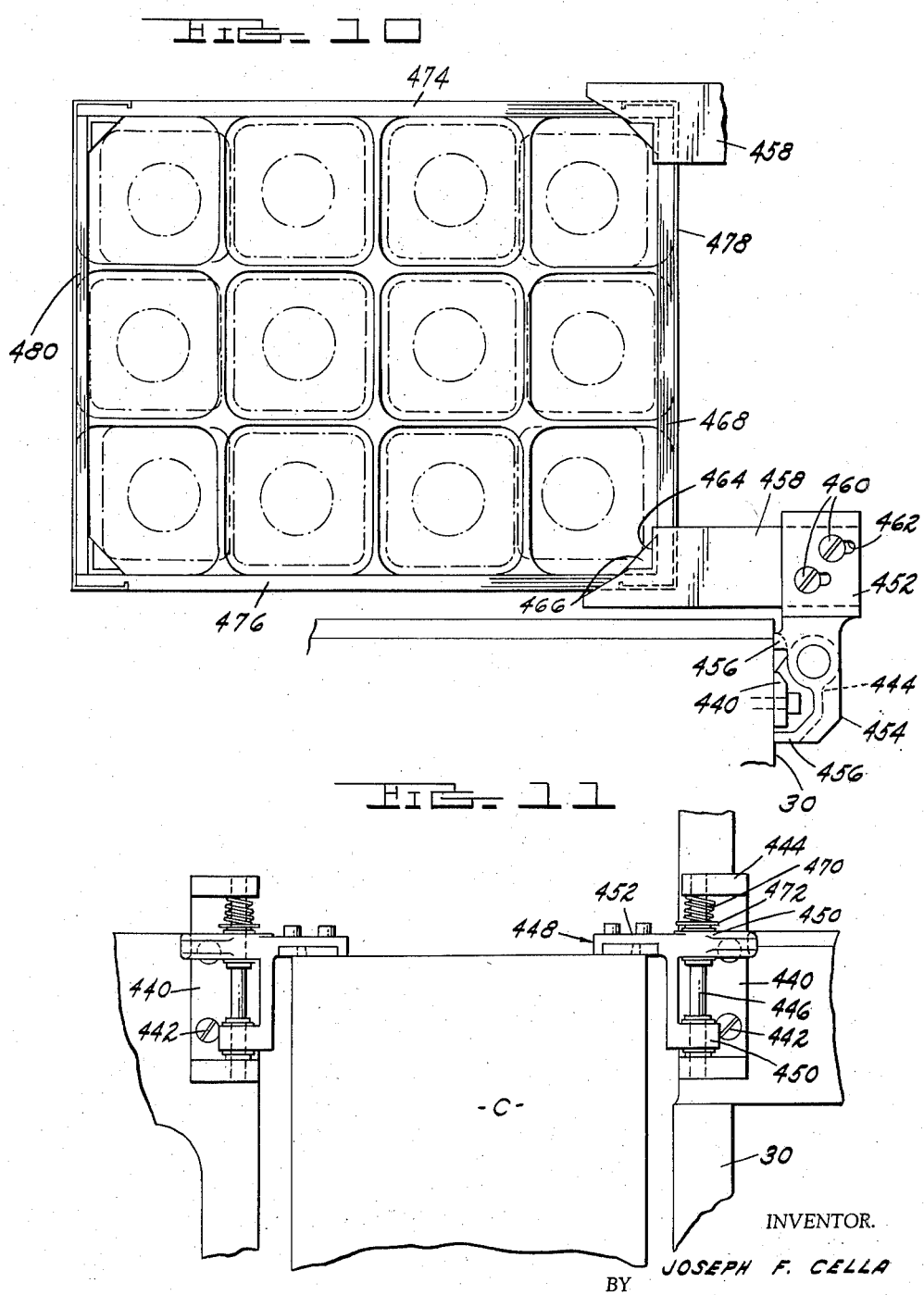

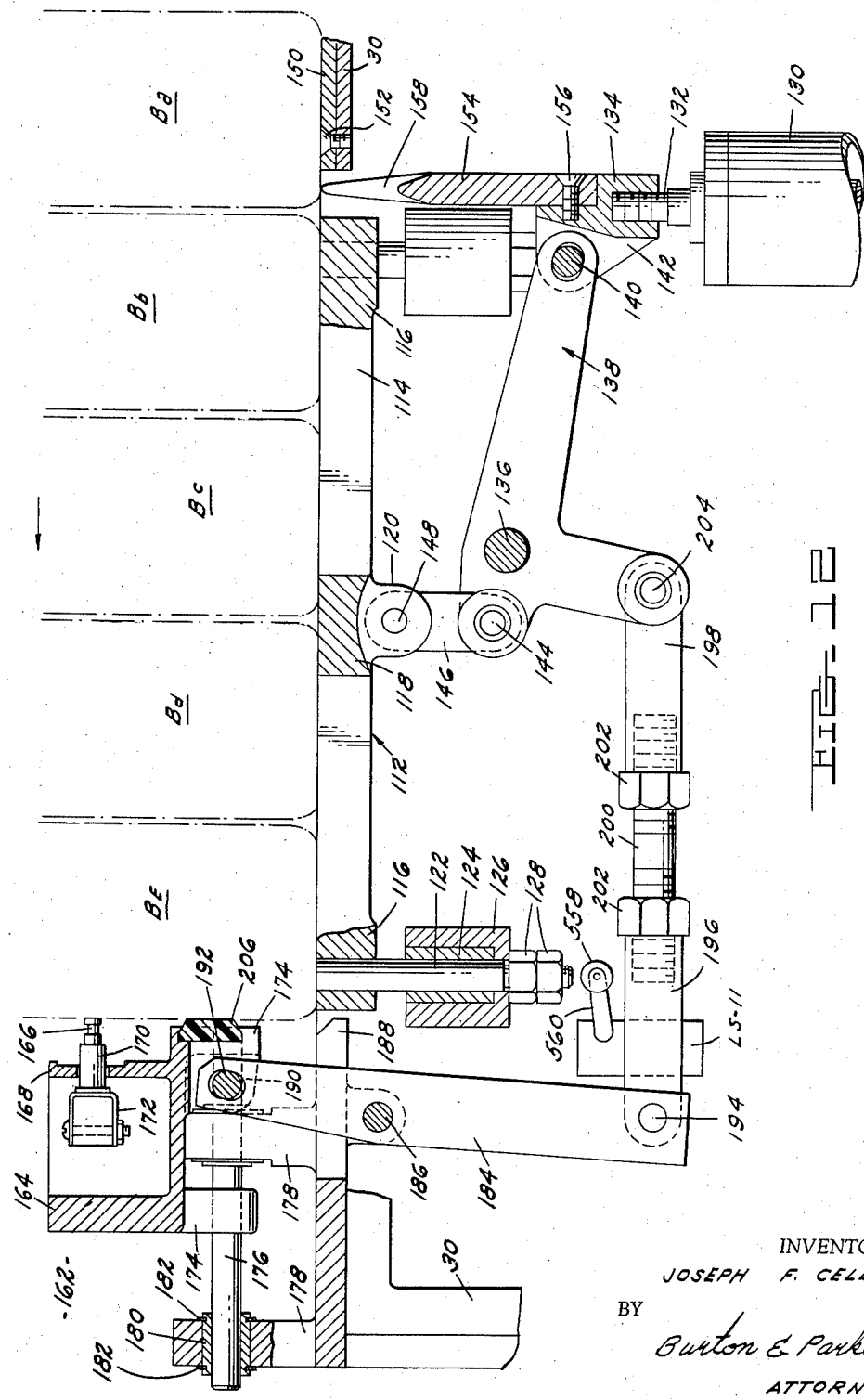

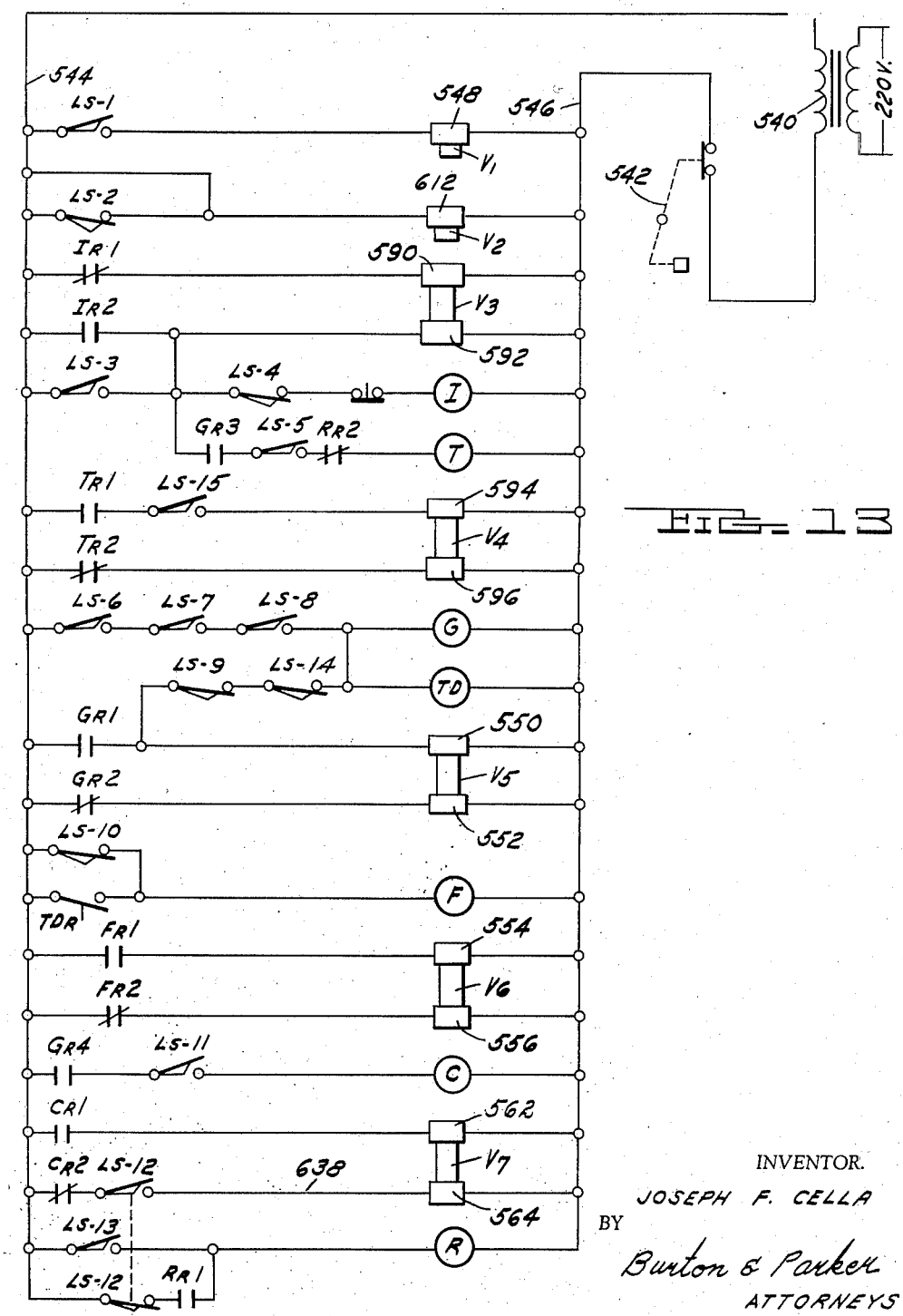

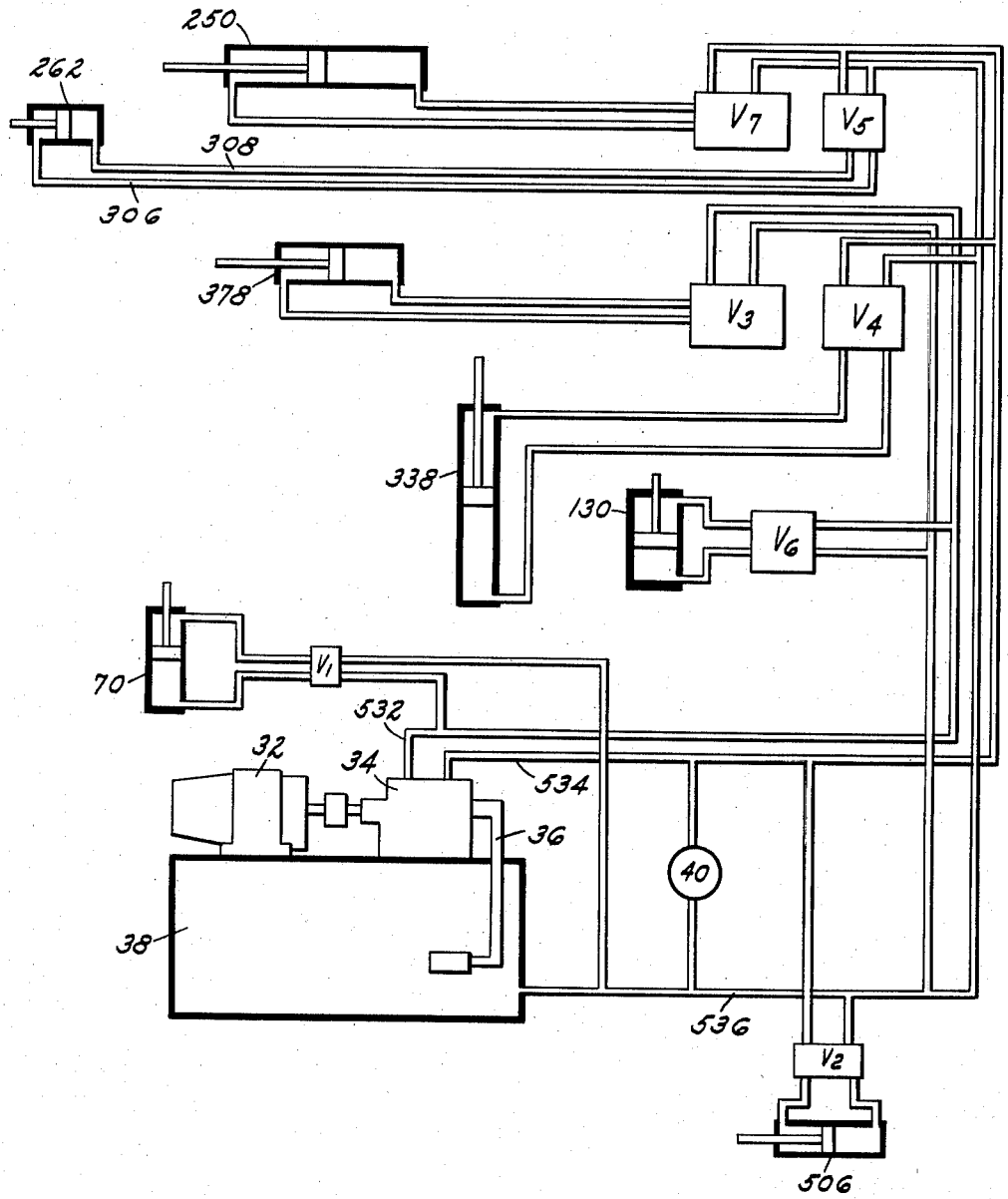

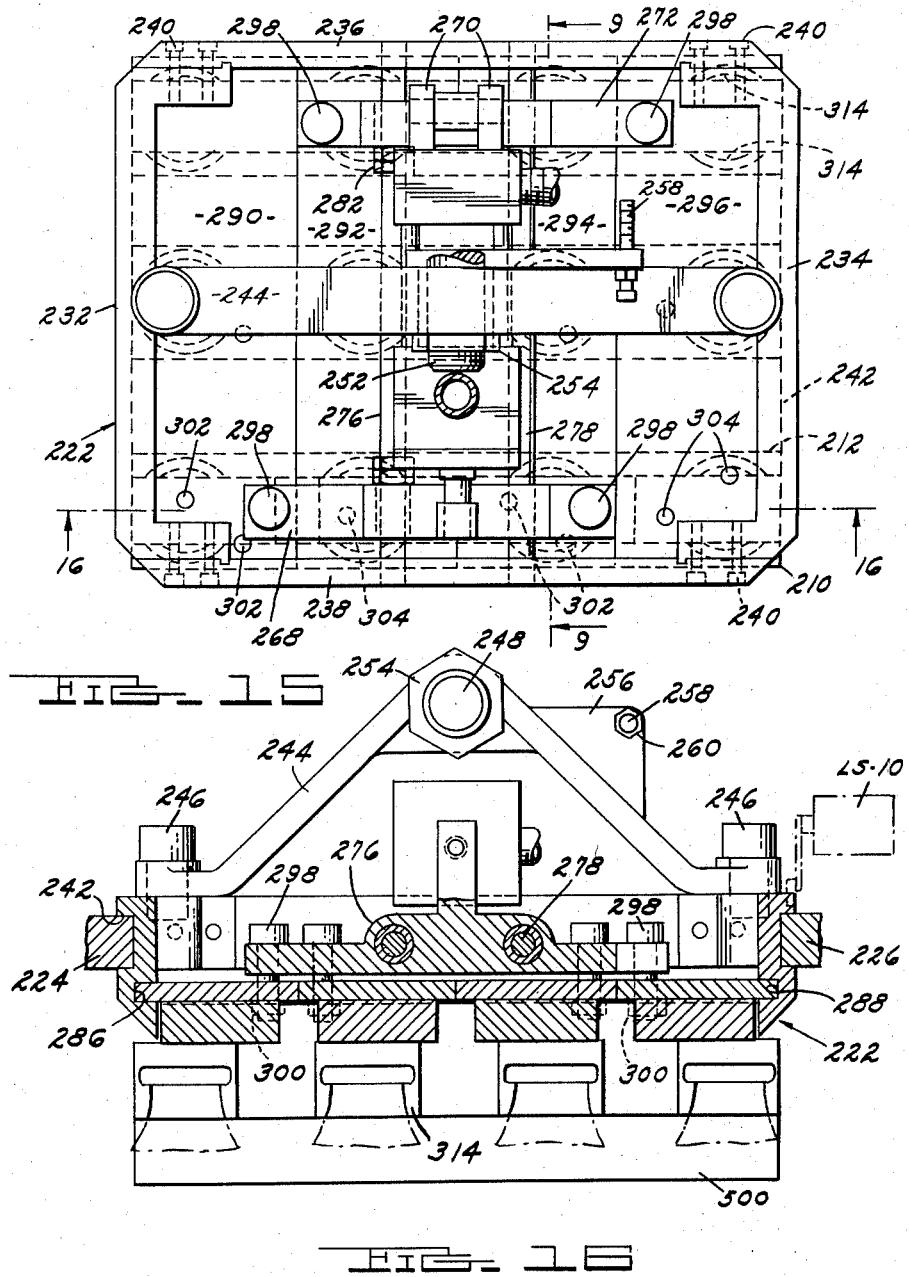

United States Patent Office 2,898,715
Patented Aug. 11, 1959

2,898,715

BOTTLE PACKAGING MACHINE

Joseph F. Cella, Bronxville, N.Y., assignor to Cella Machinery, Inc., New York, N.Y., a corporation of New York Application January 2, 1957, Serial No. 632,087

15 Claims. (Cl. 53—62)

This invention relates to bottle-handling machines and particularly to a machine for automatically filling bottle cases or crates with bottles. As used herein, the term "bottle" is intended as a generic expression covering containers made of glass, paper, plastic, metal, or the like, which contain food, beverages, or any substances desired to be so packaged, and such containers may not necessarily be in the conventional shape of glass bottles. In the illustrative embodiment of the invention herein shown and described, conventional milk bottles and milk bottle crates are the containers being handled; and it is understood that they are shown only by way of example and that the machine may be adapted to handle other types of containers without departing from the spirit of the invention. Attention is invited to the copending application in which I am a joint inventor, Serial No. 737,991, filed May 14, 1958, which discloses a machine embodying an earlier concept of an invention relating to the same art as the one herein disclosed.

This invention is embodied in a machine adapted to continuously receive a succession of bottles and a succession of bottle crates and automatically fill each crate with the required number of bottles.

The primary object of the instant invention is the improvement upon the machine disclosed in said copending application so that the machine is more efficient in operation and more certain of the intended results. As is more specifically disclosed hereinafter, the machine is adapted to receive upon a conveyor a succession of bottles from bottle-filling and capping machines. Upon being received from such conveyor the machine carries the bottles forward to a bottle-indexing station. At the same time a plurality of empty bottle cases or crates are being fed to the machine on another conveyor. One by one these cases enter the machine and are automatically moved therein into a bottle-receiving position at a crate-positioning station. A bottle carrier disposed for movement between the bottle-indexing station and the crate-positioning station is adapted to grip bottles in the indexing station and carry them toward and into a crate in the crate-positioning station. The filled crate then moves on its conveyor out of the machine and an empty crate takes its place and the operation is repeated.

In carrying out this primary object a concomitant object is the provision of improved crate reject mechanism operable to withhold the deposit of bottles in a crate disposed in a bottle-receiving station if, for any reason, the crate will not satisfactorily receive or seat the bottles therewithin. This crate reject feature will cause the bottles to be withdrawn from the crate. In carrying out this object, I have provided means for gripping a plurality of bottles at a bottle-indexing station and moving such bottles to an awaiting crate in a crate-positioning station, with such means responsive to the improper entry or seating of the bottles in the crate to effect an interruption of continued movement of the bottles into the crate and a withholding of deposit of the bottles in the crate. If the bottles have entered the crate a determined distance, even though improperly seated in the crate, the bottles will be released in the crate. However, if the bottles encounter an obstacle before entering the crate a determined distance they are withdrawn from the crate, and the crate is rejected and sent on out of the machine. The withheld bottles are thereafter deposited in the next empty crate conveyed into the crate-positioning station. It will be recognized therefore that a moving means causes movement of a bottle carrier means through a predetermined cycle of movement between the bottle supporting station and the crate supporting station so that containers such as bottles are transferred to a crate in the crate supporting station. If a bottle encounters an object during the predetermined cycle of movement prior to satisfactory placement within a crate, means responsive to the pressure of the bottle causes an interruption of the predetermined cycle of movement and a reversal of movement of the bottle carrier means to withdraw the bottle from contact with the crate or whatever object is impeding its predetermined movement. Means are also provided for enabling continued movement through the predetermined cycle of movement when the bottle has been inserted into the crate a predetermined distance.

Conditions preventing satisfactory entry or seating of bottles in a crate might be a bottle accidentally in the crate when the crate entered the crate-positioning station, deformed crate cells, deformed crate-stacking ears, or any number of other occurrences. Even the wrong size crate or an improperly positioned crate may be the cause of improper entry or seating of bottles thereby giving rise to actuation of the crate reject mechanism.

Another object of the invention serving to accomplish the primary object is the provision of improved crate stop mechanism which permits entry of but one crate at a time to the crate-positioning station.

A still further object of the invention is the provision of improved means in the crate-positioning station to hold a crate properly aligned to receive bottles for deposit therewithin.

A further object of the invention is the provision of an improved bottle-indexing station where the bottles are collected prior to being gripped by carrier means for transport to and deposit in an awaiting crate.

A still further object of the invention is the provision of an improved bottle carrier for gripping, transporting, and depositing bottles in an awaiting crate.

Other objects, advantages, and meritorious features will more fully appear from the specification, claims, and accompanying drawing, wherein:

Fig. 5 (Sheet 5) is a side view of the crate-positioning station looking from the back of the machine toward the front taken along the line 5—5 of Fig. 6;

Fig. 6 (Sheet 6) is a top view of the crate-positioning station taken along the line 6—6 of Fig. 5;

Fig. 9 (Sheet 8) is a cross sectional view taken on the lines 9—9 of Figs. 5 and 15;

Fig. 10 (Sheet 9) is a top view of a bottle crate in the crate-positioning station taken along the line 10—10 of Fig. 5;

Fig. 11 (Sheet 9) is a view of the discharge end of the crate-positioning station taken along the line 11—11 of Fig. 4;

Fig. 12 (Sheet 10) is a cross sectional view looking from the front of the machine toward the back through the bottle-indexing station taken along the line 12—12 of Fig. 3;

Fig. 13 (Sheet 11) is a schematic wiring diagram of the electric circuits of the machine; and Fig. 14 (Sheet 12) is a schematic diagram of the fluid pressure lines of the machine;

Fig. 15 (Sheet 13) is a top view of the bottle carrier shown in Fig. 9;

Fig. 16 (Sheet 13) is a cross sectional view through the bottle carrier taken on the line 16—16 of Fig. 15; and, Fig. 17 (Sheet 2) is a cross sectional view taken on the line 17—17 of Fig. 2.

General character

This invention is embodied in a machine which is intended to accomplish the final step in a bottle-filling, capping, and packaging process. The bottles leave the capping machine usually in single file, one bottle following another, and are so moved along upon a conveyor to a point at which they are deposited in cases or crates. These crates comprise square or rectangularly shaped boxes adapted to contain a plurality of bottles. When glass bottles are packaged in crates, the crates are generally provided with partitions defining bottle-receiving cells. When the bottles are formed of metal or paper, the partitions are frequently omitted. When the crates are provided with cells, the cells are generally arranged in a plurality of rows. The crates usually move in single file upon a conveyor to a point adjacent the moving bottles where the latter are deposited in the crates; the filled crates then moving to a storage space or directly onto trucks, to be distributed to consumers. This invention contemplates a fully automatic machine which will transfer the bottles to crates.

The bottles move in single file into the machine upon a conveyor and immediately thereafter are marshalled into a plurality of rows upon another conveyor, the number of rows corresponding to the number of rows of bottles to be received in the crates, or when the crates are provided with cells, corresponding to the number of rows of cells. Upon this latter conveyor the bottles move toward a transfer device which selects the proper number of bottles from each row and transfers them to an awaiting empty crate. When the crate is filled, it moves out of the machine.

Figure 1:
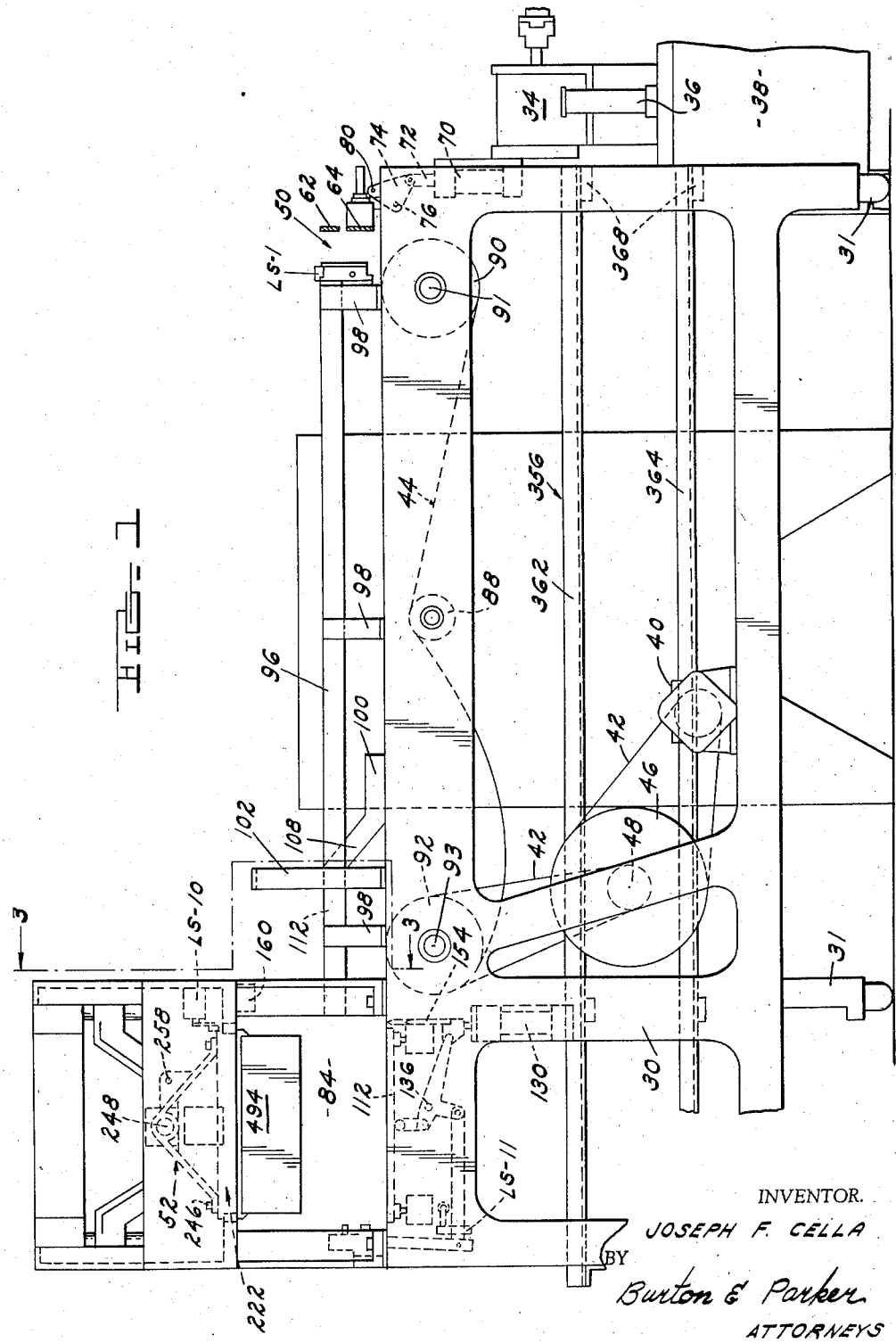
Fig. 1 (Sheet 1) is a front elevation of a machine embodying my invention.
Figure 2:
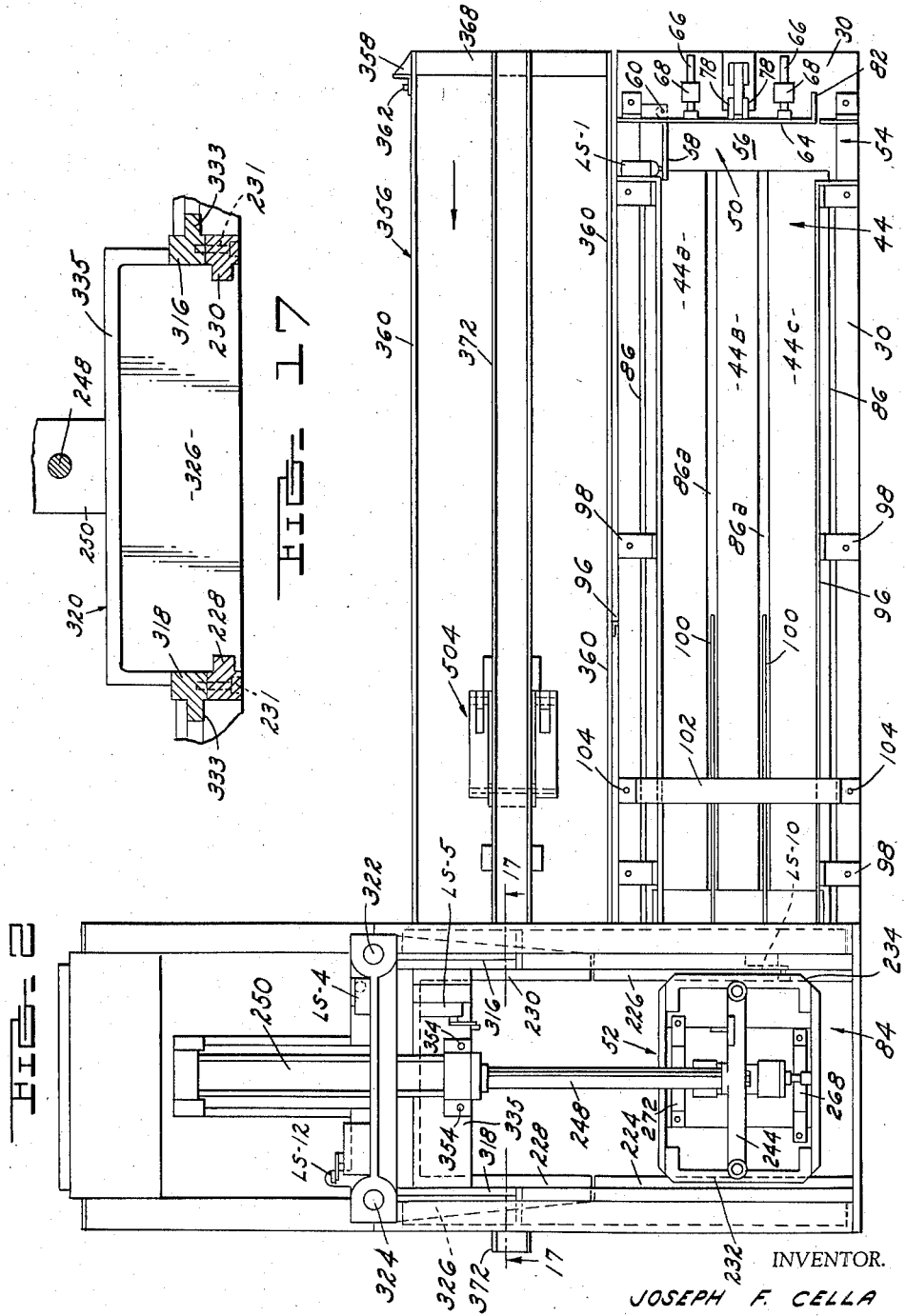
Fig. 2 (Sheet 2) is a top view of the machine shown in Fig. 1.
Figure 3:
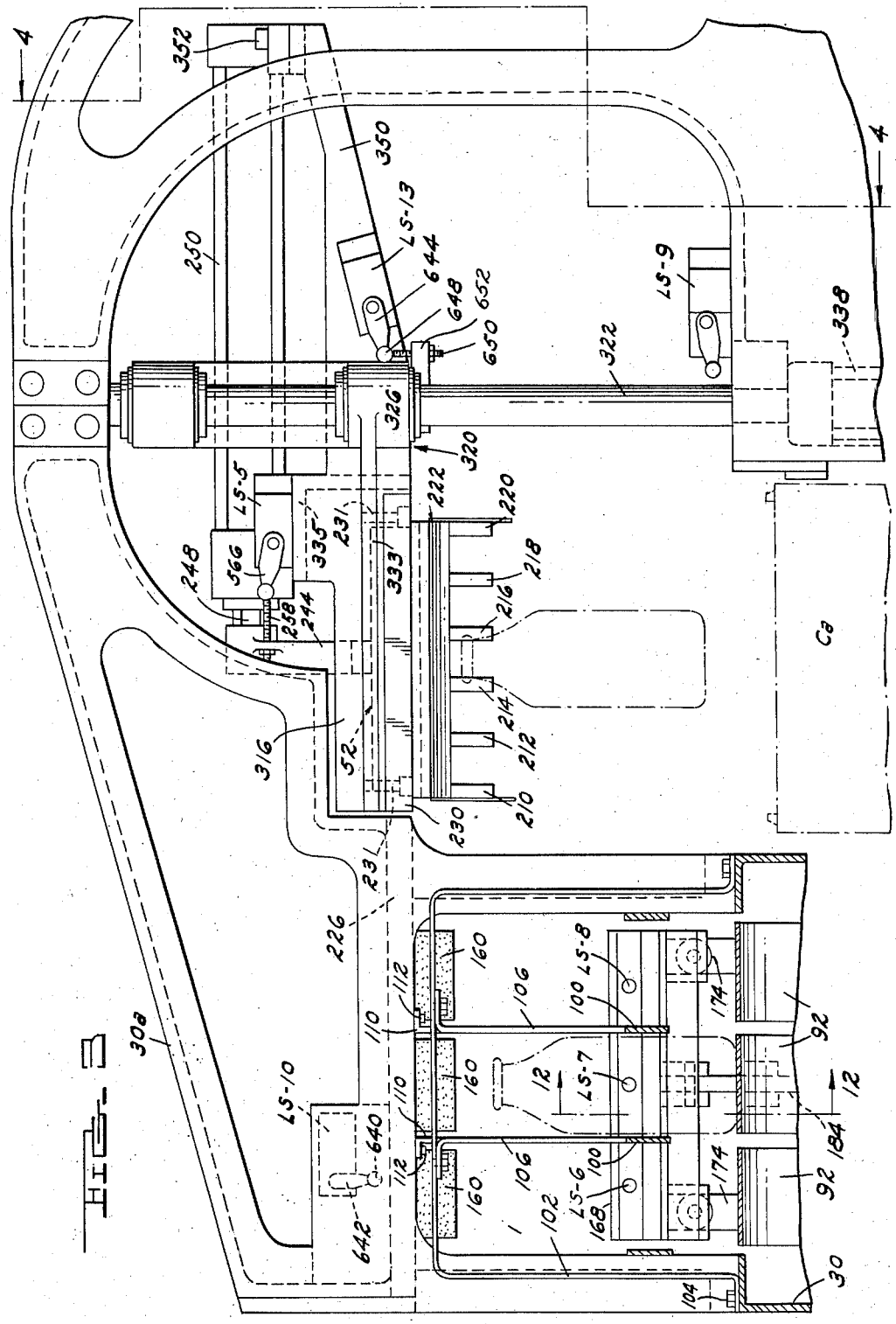
Fig. 3 (Sheet 3) is an end view of the machine shown in Fig. 1 taken along the line 3—3 of Fig. 1.

The various mechanisms which perform these operations are generally shown in Figs. 1–3. They are supported upon a framework 30 having feet 31 standing on the floor. An electric motor 32, shown in Fig. 14, coupled with a hydraulic pump 34, connected by line 36 to a hydraulic fluid storage tank 38, serves as a source of motive power for the machine. A fluid pressure rotary motor 40, connected to the fluid pressure discharge line of the pump, is coupled through a reduction drive 42 to what is hereinafter termed the triform conveyor generally indicated at 44.

Bottle conveyor

The triform conveyor 44 serves to convey three rows of bottles from the marshaling device 50 to the bottle-accumulating station where a bottle carrier 52 serves to deposit the bottles in crates. The bottles are fed to the marshalling device 50 by a single-line conveyor, not shown, and enter the marshaling device at and in the direction of arrow 54 in Fig. 2. As they enter the marshaling device they slide, one behind the other, over a platform 56. They slide over the platform because they are urged forward by the bottles behind them on the single-line conveyor. The platform 54 is just long enough to receive three bottles, or that number of bottles corresponding to the number of rows of bottles that may be received in the crates. At the far end of the platform an electric control switch LS–1, whose function is hereinafter explained, is adapted to be actuated by a lever 58 pivoted as at 60 to the machine, with the lever 58 yielding to the pressure of bottles urged against it to trip the switch.

Running along the back of the platform 56 is a back stop 62 which forms a continuation of one of the side walls of the single-line conveyor, not shown. The back stop is rigidly fastened to the frame 30 spaced thereabove as is clearly shown in Fig. 1. A ram 64 is adapted to reciprocate beneath the back stop. The ram is mounted on a pair of parallel rods 66 which are received through bearing blocks 68 which are mounted on the frame 30. A hydraulic cylinder 70 mounted on the frame 30 is provided with a piston rod 72 pivoted to a lever 74. The lever 74 is pivoted to frame 30 as at 76. The upper end of the lever 74 is received between a pair of ears 78 connected to the ram 64, and is pivotally connected to the ears as at 80. Upon reciprocation of piston rod 72, the ram 64 is reciprocated across platform 56. The ram may be provided with an end stop 82 to prevent bottles on the single-line conveyor from entering upon the platform 56 when the ram is in an extended position. The ram is shown in the retracted position in Figs. 1 and 2. The ram may be extended transversely across platform 56 to urge bottles off of the platform and onto the triform conveyor 44. Hydraulic fluid is supplied to ram 70 by lines hereinafter described.

The triform conveyor 44 comprises the conveying means adapted to convey bottles from the marshaling device 50 to the bottle-accumulating or indexing station which is generally indicated in Figs. 1 and 2 at 84. This conveyor is continuusly driven during the machine's operation. It comprises three movable endless belts 44a, 44b, and 44c. While these belts may be of any desirable construction, I have found that belts formed of pivotally connected plates of conventional construction are entirely suitable. The character of the belts should be such that while they will move bottles resting thereupon forwardly, the bottles will slide relative to the conveyor when the forward movement of the bottles is interrupted by a barrier or the like.

The belts are horizontally supported subjacent their load-carrying spans by a table 86 extending along underneath the belts and secured to the frame 30. The return spans of the belts are supported by rollers 88 as shown in Fig. 1. The belts are entrained at opposite ends about rollers 90 and 92 as shown in Figs. 1 and 3 which are mounted on suitable shafts 91 and 93 supported by frame 30. Shaft 93 is provided with a sprocket, not shown, over which reduction drive 42 is entrained to drive shaft 93 and in turn the belts. The bottles on the triform conveyor are prevented from moving sideways off of the conveyor by parallel guide walls 96 supported by suitable brackets 98 which are secured in any convenient fashion to frame 30. The guide walls 96 extend from a point adjacent the marshaling device 50 at one end of the conveyor to a point adjacent the bottle-accumulating station 84 at the opposite end of the conveyor.

As viewed in Fig. 2 the bottles move from right to left and as they approach the bottle-accumulating station 84, they pass between and around aligning walls or guide walls 100 disposed above the table portions 86a. Such walls are supported by a U-shaped bracket 102, as shown in Figs. 1–3, which is connected in any convenient manner as at 104 to the frame 30 and is provided with depending arms 106 shown in Fig. 3 which are connected to the walls 100. The walls are shaped in side elevation as shown in Fig. 1 with their outer free ends disposed adjacent table portions 86a with the walls extending angularly upwardly as at 108 and thereafter horizontally toward the bottle-accumulating station. Those ends of the walls adjacent the bottle-accumulating station are supported by depending arms 110, only the upper ends of which are shown in Fig. 3 and which are secured to the frame as at 112 in any convenient manner, with the lower ends of the arms being secured to the walls 100. The walls 100 serve to align accurately into rows the bottles moving along the triform conveyor, and the side elevational shape of the walls shown in Fig. 1 is for the purpose of engaging the bottles adjacent their bases to shift them laterally on the belts as necessary. The raised portions 112 of the walls keep the bottles in alignment as they move toward the accumulating station 84.

*Bottle indexing station*

As the bottles enter the bottle-indexing or accumulating station 84, they are supported by a vertically shiftable floor 112 shown in Figs. 1 and 12. Referring particularly to Fig. 12, the floor comprises a platform having a plurality of parallel web portions 114 which extend in the direction of travel of the bottles moving across the platform, indicated by the arrow, with the webs connected together at opposite ends by transversely extending portions 116 integral with the webs. Intermediate their length the webs are connected by transverse portion 118 provided with a pair of depending ears 120. Four depending posts 122 are rigidly secured at each corner of the platform 112. The posts 122 are received within bearings 124 which are housed within bearing blocks 126 connected in any suitable fashion to the frame 30 of the machine. The lower end of each post 122 may be threaded to receive a pair of positioning nuts 128 which may be tightened together to be locked in position on the post. Such nuts are adapted to abut the underside of the bearing block 126 and limit the upward movement of the platform or floor 112. A switch LS-11, whose function is hereinafter described, is mounted in any suitable fashion to the frame 30 of the machine to be tripped by the lower end of one of the posts 122 and the relationship of the switch to one of the posts is shown in Fig. 12.

To raise and lower the floor 112 a fluid pressure cylinder 130 is mounted in any suitable fashion upon frame 30 and is provided with a piston rod 132 which is connected to a fence block 134. A shaft 136 rotatably mounted at opposite ends in frame 30 provides a fulcrum for a modified bell crank lever 138. One arm of lever 138 is pivotally connected to the fence block 134 as at 140. Pivot 140 may be in the form of a pivot pin received through a pair of spaced ears 142 on the fence block with the lever extending into the space between the ears. Another arm of the lever 138 is pivotally connected as at 144 to a link 146 which is in turn received between the ears 120 to be pivoted thereto upon a pivot pin 148. It is now apparent that upon vertical movement of piston rod 132, lever 138 will effect a vertical shifting of floor 112.

The vertical shiftability of floor 112 permits the floor to be withdrawn from below bottles resting thereupon at the time that the bottles are transferred from the bottle-accumulating station to an awaiting crate. The bottles are shifted laterally out of the accumulating station by the carrier 52 and unless the floor is lowered there would be a tendency for the bottles to drag thereacross during their transfer out of the accumulating station, such drag upsetting their vertical suspension from the bottle carrier 52.

Disposed at the discharge end of the triform conveyor is a plate 150 which is mounted upon the frame 30 as by screws or the like 152. The plate 150 extends over the rollers 92 which support that end of the conveyor belts adjacent the bottle-accumulating station. The plate 150 substantially bridges the gap between the rollers 92 and the belts entrained thereupon and the floor 112. The plate 150 does not extend completely to the floor 112 but is spaced therefrom a slight distance as shown in Fig. 12 to permit a bottle fence 154 to shift vertically between the plate and the floor 112. The fence is adapted to prevent bottles leaving the triform conveyor from entering the bottle-accumulating station while the bottle carrier 52 is in the process of transferring and depositing bottles in an awaiting crate. The fence may be secured to the fence block 134 by means of screws or the like 156. The upper edge of the fence may be tapered as at 158 so that it will readily enter between bottles resting on the floor 112 and upon the plate 150. As shown in Fig. 12 the fence 158 is disposed just beneath a bottle indicated at $B_a$ which rests upon the plate 150 and is disposed closely adjacent the preceding bottle $B_b$ which is resting upon the floor 112. As the fence 154 is elevated, which elevation occurs simultaneously with the dropping of floor 112, bottle $B_a$ may be lifted slightly from plate 150 and pivoted rearwardly so that the fence 154 can slide up in front of the bottle. In order to prevent breakage of bottle $B_a$ in the event that it fails to tilt rearwardly and permit the fence to slide up in front of it, but instead is raised by the fence toward the overhead carrier frame 30a, I have provided three resilient blocks 160 shown in Fig. 3 which are secured in any convenient fashion to the carrier-supporting frame 30a. The blocks are disposed directly above bottle $B_a$, and the relationship of the blocks to the fence 154 is shown in Fig. 1. As one or more bottles are raised by the fence through failure to tilt rearwardly and permit the fence to pass upwardly in front of them, the mouths of the bottles strike the blocks 160 instead of the carrier-supporting frame 30a and such resistance to continued upward movement offered by the blocks 160 permits the fence 154 to slide up in front of the bottles.

Sensing means are provided which are responsive to the presence of a determined plurality of bottles in the accumulating station to cause actuation of the bottle carrier to transfer the bottles in the station to an awaiting crate. Such sensing means are mounted at the bottle-accumulating station for shiftable movement toward and away from the station. Such shiftable movement of the sensing means is provided in order to remove the sensing means away from the station when the bottles are transferred therefrom and to return the sensing means to the station when the transfer of the bottles to an awaiting crate has been completed and the carrier has returned to the station in preparation for transferring another group of bottles to a succeeding crate. Such sensing means are shown in Figs. 1, 3, and 12 at 162 and include a shiftably supported switch box 164 adapted to house a plurality of electric switches LS-6, LS-7, and LS-8, one switch for each row of bottles moving into the accumulating station. Obviously a greater or lesser number of switches might be provided depending upon the number of rows of bottles. Each switch is adapted to be actuated independently by a plunger 166 extending outwardly through the wall 168 of the shiftable switch box. Each plunger may be supported for shiftable movement by any suitable bearing means shown at 170. The plunger 166 may be connected to its switch by means of a U-shaped bracket 172. The switches are not shown in Fig. 12 for the reason that they are of conventional construction.

The switch box 164 is provided with four depending ears 174 shown in Figs. 3 and 12 arranged in two aligned pairs and through each pair extends a rod 176. The rods 176 are fixedly secured to the ears and are themselves supported by four upstanding bearing blocks 178, two bearing blocks for each rod. Each bearing block is provided, as shown in Fig. 12, with a bearing 180, which may be held in its supporting block by a pair of snap rings or the like 182. Such bearings blocks are mounted in any convenient fashion upon frame 30. It is apparent that the switch box 164 may shift upon the rods 176 relative to the frame 30.

In order to shift the switch box, linkage is provided connecting the box with the mechanism for raising and lowering the table 112 and fence 154. Such linkage includes a lever 184 pivoted as at 186 to the frame 30 and extending through a slot 188 in the frame to be received between a pair of spaced ears 190 connected to the underside of the switch box and pivotally connected to the ears by means of a pivot pin 192. The lower end of lever 184 is pivotally connected as at 194 to a pair of adjustment links 196 and 198 connected together by a screw-threaded member 200 having lock nuts 202 thereupon. Adjustment link 198 is pivotally connected to an arm of the bell crank 138 as at 204. It is apparent that upon swinging of lever 138 about its pivot shaft 136, the switch box 164 will be reciprocated, and that as the table 112 is lowered and the fence 154 is raised, the switch box 164 will be retracted away from bottles in the bottle-accumulating station.

The switch box 164 may be provided with a nylon or the like abutment 206 which is secured in any convenient fashion to the switch box and is adapted to be engaged by the leading bottles E of the group of bottles entering the accumulating station. The function of the abutment 206 is to prevent the entire force of the bottles in the accumulating station from being taken by the plungers 166. Without the provision of the abutment the plungers 166 would themselves have to stop continued movement of the bottles in the accumulating station when the station is full. The relationship of the abutment 206 to the plungers 166 is such that the plungers will be shifted inwardly before the bottles come to rest against the abutment.

Bottle carrier

The machine is provided with means for transferring bottles from the accumulating station laterally and downwardly into each of a succession of crates successively positioned in the crate-supporting station. Such means is responsive to the pressure of a bottle improperly entering or seating in an awaiting crate to withdraw the bottle or bottles from the crate, or if the bottles have entered the crate a determined distance, to release the bottles therein even though one or more is not properly seated. Such means includes a yieldably supported portion or part, namely, the carrier 52, which engages the bottles to be transferred and which will yield to the pressure or resistance of a bottle improperly seating in the crate of actuate control means causing the withdrawal of the bottles.

The bottle carrier 52 is supported for laterally shiftable movement in guideway means which extend over both the bottle-accumulating station and the crate-supporting station with that portion of the guideway means disposed above the crate-supporting station being mounted for vertically shiftable movement toward and away from a crate in the crate-supporting station. When the carrier shifts laterally from a position over the accumulating station to a position over the crate-supporting station, in such latter position it is carried by the vertically shiftable portion of the guideway means, and such portion of the guideway means carries the carrier toward and away from a crate in the crate-supporting station to move bottles suspended from the carrier into the crate. In Fig. 3 the bottle carrier is shown disposed above a bottle crate $C_a$ and the carrier is laterally shiftable to the left to a position disposed above bottles in the accumulating station 82.

That portion of the carrier guideway means supported for vertical reciprocation above the crate-supporting station is hereinafter referred to as the carriage. The carriage rests upon a yoke connected to a vertically operable piston. The carriage is so supported on the yoke that in the event a bottle suspended from the carrier improperly seats in a crate in the crate-supporting station, the carriage will shift relative to the yoke with such relative movement causing the actuation of means which serve to cause the yoke to reverse its movement and raise the carriage and consequently the carrier toward the position shown in Fig. 3, all as more particularly described hereinafter.

The carrier is shown in Figs. 1, 3, 9, 15, and 16. It includes a plurality of pairs of opposed bottle-gripping bars, corresponding in number to the rows of bottles entering the bottle-accumulating station. When the apparatus is adapted, as is the apparatus herein disclosed, to fill in one cycle an awaiting bottle crate, the number of pairs of bottle-gripping bars will correspond to the number of rows of bottles which may be received in each crate. In the apparatus herein disclosed, three rows of bottles are to be received in each crate and therefore three pairs of opposed bottle-gripping bars are provided. Such bottle-gripping or clamping bars are shown in Figs. 3 and 9 at 210, 212, 214, 216, 218, and 220. The bars are supported within a carrier frame 222, see Figs. 3 and 15, for relative laterally slidable movement. The frame 222 is itself slidably disposed between the guideway means comprising guideways 224 and 226 which are mounted upon the carrier-supporting frame 30a shown in Fig. 1. These guideways are parallel and extend, as shown in Figs. 2 and 3, substantially halfway across the width of the machine where they meet the vertically shiftable carriage which includes the guideways 228 and 230.

The carrier frame 222, as shown in Fig. 15, includes opposed side members 232 and 234 secured together in spaced relation by the tie members 236 and 238, with bolts or the like 240 extending through members 236 and 238 and into the side members 232 and 234. The side members 232 and 234 are each provided with an outwardly opening slot 242 within which is received the guideway means as shown in Fig. 16 whereby the carrier frame 222 is supported for lateral slidable movement. A carrier bridge 244 extending between the side members 232 and supported for lateral slidable movement. A carrier bridge 244 extending between the side members 232 and 234 and connected thereto as by bolts or the like 246 is coupled with the end of the piston rod 248 of the fluid pressure cylinder 250 shown in Figs. 3, 9, and 15. The cylinder 250 serves to laterally shift the bottle carrier from the position over the bottle-accumulating station shown in Fig. 2 to the position disposed above the crate-positioning station as shown in Fig. 3. The outer end of piston rod 248 is threaded as at 252, see Fig. 15, and a nut 254 is threaded thereupon and bears against the bridge 244. The bridge is provided with a laterally extending ear 256 having a horizontally extending threaded pin 258 threadedly connected thereto and locked in position by a lock nut 260, the purpose of such pin being hereinafter described.

A fluid pressure cylinder 262, shown in Fig. 9, is slidably supported upon the bottle carrier for movement relative to the carrier frame. The cylinder is provided with a piston rod 264 which is threadedly connected at its outer end to a member 268 and locked in position by a set screw 266. The opposite end of the cylinder is provided with a pair of spaced-apart ears 270, as shown in Figs. 9 and 15, between which is received the upper end of member 272 which is connected between the ears by a pin or the like 274. Members 268 and 272 are slidably mounted on a pair of piston-supporting rods 276 and 278, shown in Figs. 9, 15, and 16, which are received at their opposite ends within the tie members 236 and 238 of the carrier frame and are secured thereto by the set screw 280. Rod 276 is threaded from its opposite ends inwardly and two pairs of lock nuts 282 and 284 are threaded over opposite ends of the rod and abut the members 268 and 272 to limit their sliding movement on the rods. Upon adjustment of the lock nuts the movement of members 268 and 272 may be accurately determined.

The inside of each of the side members 232 and 234 of the carrier frame is provided with a longitudinally extending slot shown in Fig. 16 at 286 and 288. Four bottle-gripping bar-supporting plates, shown in Fig. 15, at 290, 292, 294, and 296, are disposed within the frame in edge abutment, with the outside plates 290 and 296 received at their outer edges within the grooves 286 and 288 of the carrier frame. Grooves 286 and 288 help support the plates 290 and 296 within the frame and locate all of the plates laterally within the frame. The plates are supported in coplanar alignment within the frame by means of bolts 298 extending through the members 268 and 272 and provided with nuts 300. Four such bolts are provided with two of the bolts in each of the members 268 and 272. The bolts in member 268 connect such member with the plates 290 and the plate 294 while the bolts in member 272 connect such member with the plates 296 and 292.

Suspended from plates 290–296 are the paired bottle-gripping bars hereinbefore mentioned. One bar of each pair of bars is connected to two of the plates while the other bar is connected to the other two plates. For example, bar 210, shown in Figs. 3 and 15, is connected by bolts 302 to plates 290 and 294 while its opposed bar 212 is connected by bolts 304 to plates 292 and 296. The same holds true for the other bars. With the bars thus connected to the plates, upon a pressurization of first one end and then the other end of the cylinder 262, the bars are either opened or closed. Fluid pressure lines for the cylinder 262 are shown at 306 and 308 in Fig. 9.

The bottle-gripping bars are each provided with a downwardly extending portion 310 and a pair of spaced-apart horizontally extending ear portions 312. Into the ear portions the screws 302 and 304 are received for connecting the bars to the plates. As described in the copending application of Cella and Gancia Serial No. 417,448, filed March 19, 1954, the bottle-gripping bars are provided with nylon inserts 314, such inserts being so shaped that they are received about the mouths of bottles disposed between the bars to hold the bottles gripped by the bars in determined spaced relation.

Carriage

The guideway extensions 228 and 230 are carried by a carriage 320. The carriage is shown in Figs. 2, 3, 4, 8, and 17. The guideway extensions are connected as by bolts 231 to the underside of the parallel arms 316 and 318 of the carriage 320. The carriage is mounted for vertically slidable movement upon a pair of posts 322 and 324. The opposite ends of the posts have reduced diameter portions at 325, see Fig. 4, which are anchored in any suitable fashion at opposite ends in the frame 30 and subframe 30a. The carriage includes, in addition to the two parallel arms 316 and 318, a bight portion 326, shown in Figs. 4 and 8, at opposite ends of which are bearings 328 which are received about the posts 322 and 324. Formed integrally with and extending upwardly away from the bight 326 of the carriage is a truss 330 which, at the outer ends of the arms thereof, is provided with bearings 332 which are received about the posts 322 and 324. The bearings 326 and 332 support the carriage for vertically slidable movement upon the posts.

Figure 4:
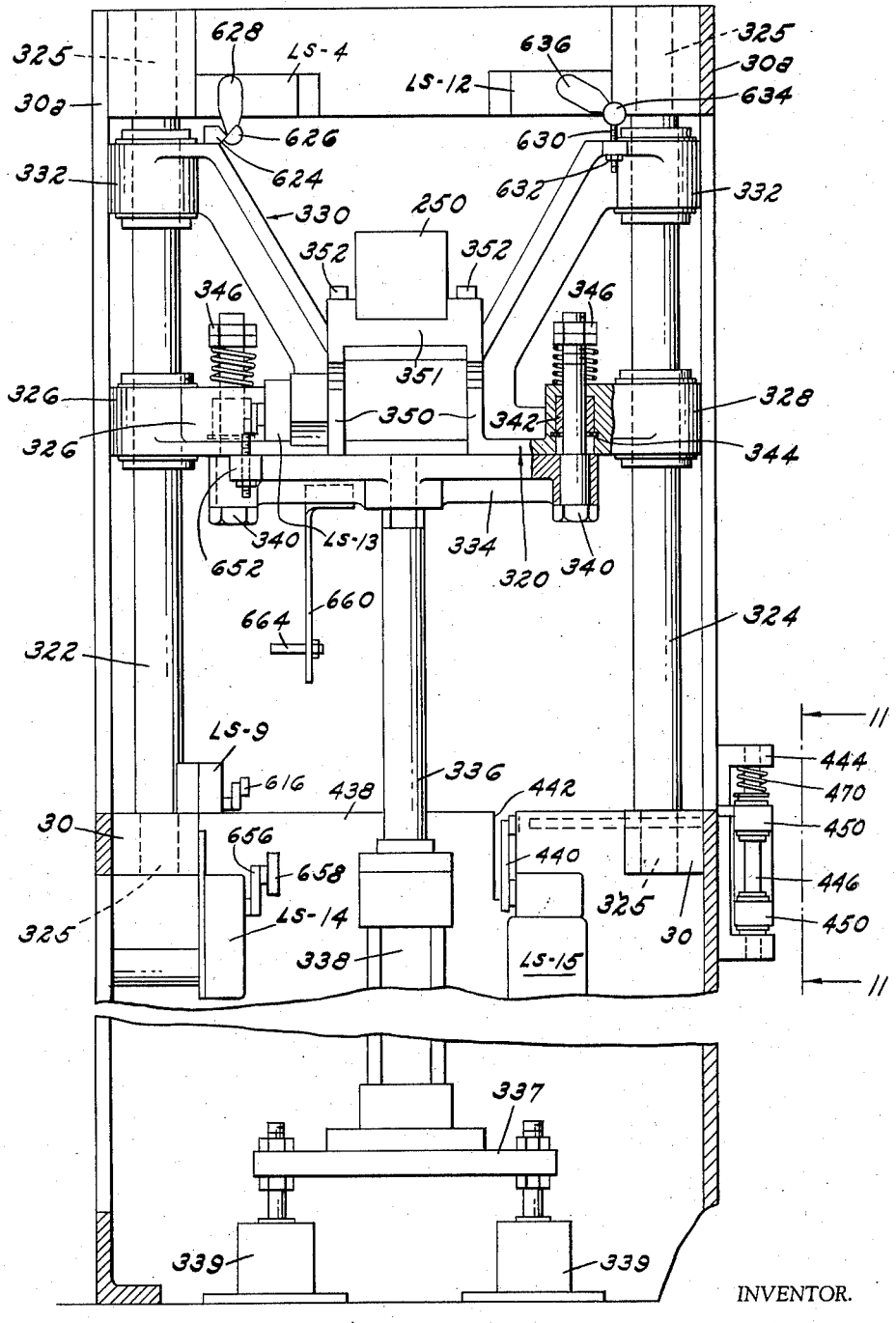
Fig. 4 (Sheet 4) is a cross sectional view taken on the line 4—4 of Fig. 3.

The parallel carriage arms 316 and 318 are each provided with a web 333 as shown in Figs. 3 and 17, along the outside thereof, which extend to the bearings 326 and 338. Extending between the arms 318 and 320 is a bridge portion 335 which supports the piston end of the fluid pressure cylinder 250. Bolts or the like 354, shown in Fig. 3, secure the cylinder to the bridge. To secure the rear end of cylinder 250 to the carriage, a pair of arms 350 are provided as shown in Figs. 3 and 4, which are integral with the bight portion 326 of the carriage. A bridge portion 351 extends between the arms 350 and the rear end of fluid pressure cylinder 250 rests thereupon and is secured thereto by means of bolts or the like 352.

When the carriage is at its uppermost position of travel on the posts, the guideway extensions 228 and 230 thereof are aligned with the guideways 224 and 226 such that the carrier 52 can slide from the guideways 224 and 226 onto the guideways 228 and 230. Thereafter, upon lowering of the carriage 320, the carrier is moved downwardly toward a crate C in the crate-supporting station.

Yoke

Figure 8:
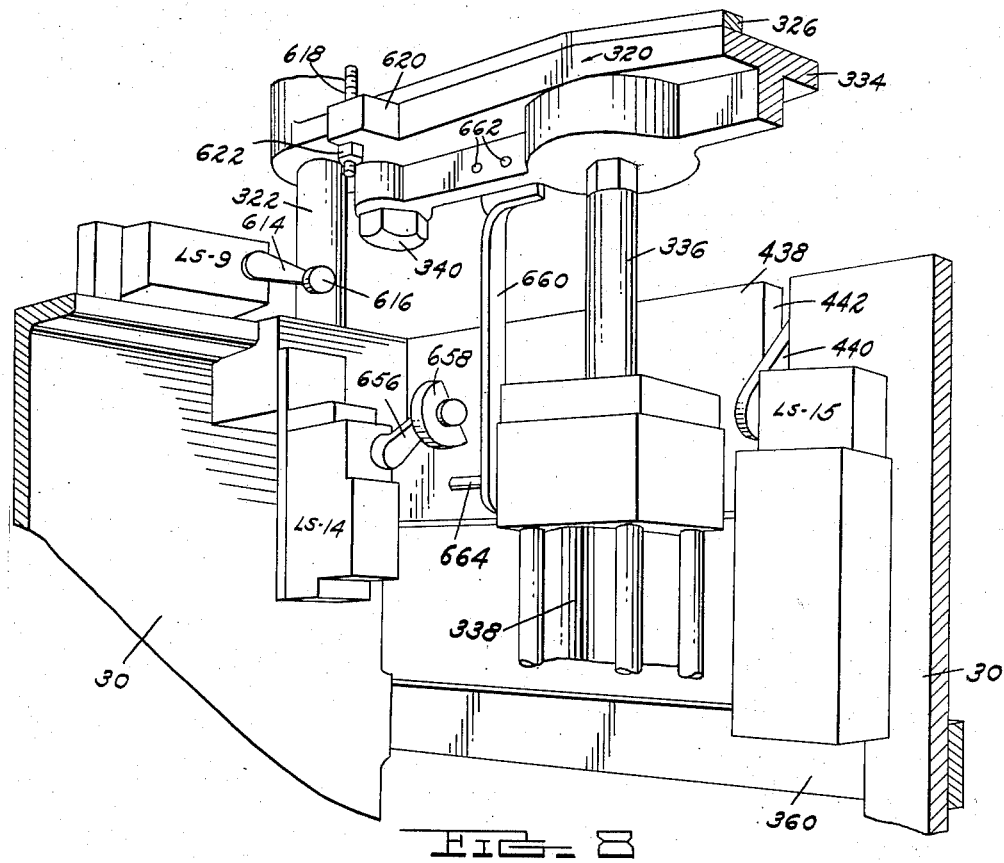
Fig. 8 (Sheet 7) is a perspective view of a portion of the machine shown in Fig. 4.

In order to shift the carriage vertically, a yoke head 334, shown in Figs. 4 and 8, is provided. The yoke is generally T-shaped as shown in Fig. 8 and is mounted on the upper end of a piston rod 336 which is received within a fluid pressure cylinder 338, the cylinder being mounted upon a cross piece 337 which is supported by resilient blocks 339. The yoke is adapted to abut the underside of the carriage 320 as shown in Figs. 4 and 8 and upon upward movement of piston rod 336, the carriage 320 is carried upwardly. Upon downward movement of the piston rod 336, the weight of the carriage 320 and the carrier supported thereupon will cause the carriage to follow the yoke downwardly. In order to tie the yoke and carriage together but still permit relative shiftable movement therebetween, in the event that a bottle suspended from the carriage should strike an obstacle in a crate toward which the carrier is moving, thereby interrupting downward movement of the carriage, a pair of pins or the like 340 are received upwardly through bearings 342 in the carriage, which bearings are held in the carriage by the retainer rings 344. The pins extend upwardly above the carriage where any suitable means, such as nuts 346, are threaded on the pins to prevent the pins from dropping out of the carriage. The nuts 346 also serve to slightly compress light springs 348, which are received over the pins 340 to bear at their lower ends against the carriage.

Crate supporting station

The crates are fed to the machine on a conveyor 356 shown in Figs. 1, 2, 5, and 6 in the direction of the arrow shown in Figs. 2 and 5. The crate conveyor includes a leg 358 which stands upon the floor. Extending transversely of the conveyor between the leg and the frame 30 are a pair of vertically spaced-apart members 368. Extending along the conveyor at opposite sides are guide rails 360, which are secured to the leg 358 and frame 30 as by bolts or the like 362. Extending along the length of the conveyor 356 and resting upon the members 368 are upwardly open chain conveyor guide channels 372 and 374. Cross members 371 secured to frame 30 support the opposite ends of the conveyor chain channels, as shown in Fig. 5. Channel 372 supports the upper crate-feed span of the chain conveyor 376 shown in dotted outline in Fig. 5, while channel 374 supports the return span of the conveyor chain. The crate conveyor extends through the crate-supporting station hereinabove mentioned and is adapted to feed crates into the station and carry them out of the station. Suitable sprockets, not shown, are provided over which the chain 376 is entrained.

The crate-supporting station is shown in Figs. 5 and 6. As a crate moves into the crate-supporting station and reaches a determined position therein, it is raised off of the chain conveyor 376. Crates following the one raised off of the conveyor are stopped by crate-interrupting mechanism. The elevating mechanism for raising each crate off of the conveyor chain 376 includes a fluid pressure cylinder 378 which is bolted as at 380 to the frame 30 of the machine. The fluid pressure cylinder includes a piston connected as at 382 to a link 384. The link 384 is pivotally connected as at 386 to a lever 388. The lever 388 is fixedly connected to a shaft 390 which is supported at opposite ends on a pair of side members 392 which extend between upright portions of the frame 30 and are connected thereto as at 394. Another shaft 396 extends between the members 392 and is supported therein. Suitable bearings are provided for supporting shafts 394 and 396 in members 392.

Mounted upon each of the shafts are a pair of upwardly extending arms. The arms mounted on shaft 394 are indicated at 398 and 400. The arms 398 and 400 are fixed on shaft 394 to move therewith. Arms 402 and 404 are mounted on shaft 396 to move therewith. The arms 398, 400, 402, and 404 are connected together by crate-lifting bars 406 and 408. The crate-lifting bars are pivotally connected to the arms as at 410 and 412 as shown in Fig. 5. Upon retraction of the piston into the cylinder 378, the link 384 is moved to the right as viewed in Fig. 5 and the crate-supporting bars 406 and 408 are disposed in the solid outline position shown in Fig. 5. Upon extension of the piston of cylinder 378 the crate-supporting bars are raised to the dotted outline position shown at 408a in Fig. 5, and a crate resting on the chain 376 is raised to the dotted outline position shown at C–1.

Means are provided on the upper surface of the crate-elevating or crate-supporting bars 406 and 408 for accurately locating each crate on the bars at the time of its elevation. Such means includes a slidably mounted block 414 shown in Figs. 5 and 6. Each of the bars is provided with a slot 416 therethrough closed at the upper end by the block 414 and into which extends a depending part 418 integral with the block and horizontally bored to receive a set screw 420 having a lock nut 422 overlying one end of part 418 and determining movement of the block toward the right as viewed in Fig. 5. The part 418 is provided with a bore portion into which a spring 424 is received bearing at one end against the bottom of the bore and extending out of the part 418 at the other end and seated within a backup member 426 which abuts the opposite end of the slot. The bottom of the slot is closed by a plate 428 which is screwed to the part 418 as at 430. The spring 424 permits yielding movement of the block 414 to the left as viewed in Fig. 5. The block 414 on each of the crate-elevating and positioning bars is adapted to engage the inside surface 432 of the front end wall of the crate $C_a$ as shown in dotted outline in Fig. 5 where block 414 is indicated at 414a.

Extending along one side of the conveyor within the crate-supporting station and secured to the frame 30 as by bolts or the like 434, as shown in Fig. 5, is an electric switch supporting bar 436 to which an electric switch LS–3 is secured on that side of the bar outwardly of the conveyor. The switch is described in greater detail hereinafter. Extending along the opposite side of the conveyor within the crate-positioning station is a plate 438 as shown in Fig. 8, behind which is mounted a limit switch LS–15 having an actuating arm 440 extending into the crate-positioning station through a slot 442 in plate 438.

Means are provided for engaging the upper leading edge of the crate and accurately positioning the crate in the bottle-receiving position. Such means in cooperation with the positioning blocks 414 on the crate-elevating bars 406 and 408 hold successive crates properly aligned with bottles carried thereinto by the bottle carrier. The means for engaging the upper leading edge of each crate when the same is elevated are shown in Figs. 5, 6, 10, and 11, and include devices for engaging over the upper leading edge of the crate and abutting the stacking ears thereadjacent. Such devices are supported for yieldable shiftable movement. Such means include a plate 440, as shown in Fig. 11, at each side of the crate conveyor at the discharge side of the crate-supporting station. Each plate is secured to the frame 30 of the machine by means of bolts or the like 442, and includes a pair of outwardly projecting vertically spaced-apart ears 444 as shown in Fig. 5, between which extends and through which is fixedly received a pin 446. Mounted on the pin for vertically slidable movement is the crate-engaging device 448. Each crate-engaging device includes a pair of bearing members 450 which are received over the pin 446. Each device includes an inwardly extending arm 452 shown in Figs. 10 and 11 and another arm extending in the opposite direction from arm 452 and indicated at 454, which latter arm is provided with portions 456 adapted to abut the frame 30 on opposite sides of the plate 440, as shown in Fig. 10, to prevent rotation of the device about the pin 446.

Adjustably connected to the arm 452 of each device 448 and extending into the crate-supporting station is a notched element 458, which is secured to arm 452 by means of screws or the like 460 received through slots 462 in the element. The element 458 is provided at its outer end with a stacking ear receiving notch 464 into which the stacking ear 466 is received at that leading corner of the crate where the element is disposed. The element 458 is adapted to overlie the upper edge 468 of the crate as shown in Fig. 10. A coil spring 470 is received over pin 446 and abuts at its upper end the upper ear 444 of plate 440, and at its lower end a washer 472 which seats upon the upper bearing 450 of the device 448. The spring 470 resiliently urges the device 448 downwardly along the pin 446. As a crate is elevated by the crate-elevating and positioning mechanism, the devices 448 will give way slightly to permit the crate elevator to reach the upper limit of travel while urging the crate firmly down against the crate elevator by virtue of the springs 470. If there is any slight variation in the height of the crates moving into the crate-positioning station, the springs 470 will compensate for the varying height of the crates.

It will be observed that the resiliently mounted crate-positioning devices 448 cooperate with the resiliently mounted crate-positioning blocks 414 on the elevating bars 406 and 408 to accurately position a crate to receive bottles during deposit by the bottle carrier. The blocks resiliently urge the crate-stacking ears against the notches 464 of the elements 458, while the latter urge the crate rearwardly against the blocks and hold the crate downwardly against the bars. In fact, a couple is established between the elements 458 and the blocks which tends to urge the rear end of the crate down against the elevating bars.

The position of the elements 458 with respect to the arms 452 limits or determines the forward position of the crates in the bottle-receiving position. By adjustment of the elements 458 the fore-and-aft position of the crates may be accurately determined.

A representative crate is shown in Figs. 9 and 10 as including four walls 474, 476, 478, and 480. Vertically spaced-apart grids 482 and 484 are disposed within each crate with the grids defining vertically aligned bottle-receiving openings 486 and 488. These vertically aligned bottle-receiving openings form bottle-receiving cells. Each grid element may be formed of sheet metal which is bent in cross section as shown in Fig. 9. The floor of the crate may be formed by a plurality of wires 490 which extend across the bottom of the bottle-receiving cells to support the bottles in the crate. As shown in Fig. 10, the openings in the grids are only slightly larger than the outside dimensions of the bottles and because of this the bottles must be accurately spaced apart and held against unintentional swinging movement as they are lowered into the crate. While the crate shown is provided with grids of the character described, other crates may have cells defined by perpendicularly intersecting wires or by wooden partitions or the like. Each crate is provided at each corner with a stacking ear 466 heretofore mentioned.

*Anti-pendulation springs*

In order to prevent pendulation of the bottles as they are lowered into the crate and to ensure that they pass inside of the stacking ears 466 and inside of the crate walls, I have provided, as shown in Fig. 9, a pair of oppositely disposed flexible spring elements or plates 492 and 494 which are secured to the bottle carrier at opposite sides thereof. In order to effect securement, a member 496 overlies the upper marginal edge of each of the springs, and bolts or the like 498 are received through the members and plates and threaded into the outside bottle-gripping bars 210 and 220. The springs 492 and 494 each comprises a plate formed of spring metal, the lower margin of which may be beaded as at 500 to bear against the bottles suspended from the carrier. The spring plates are adapted to flex from the position shown in solid outline in Fig. 9 to the position shown in dotted outline at 492 and 494a.

When the bottle-gripping bars of the carrier have moved to grip a caseload of bottles in the bottle-indexing station, the spring plates are urged against the outside rows of bottles to tension such rows inwardly and prevent pendulation. As the carrier moves laterally to a position over a crate disposed in the crate-positioning station, the plates prevent the bottles from swinging as the carrier comes to an abrupt stop over the crate-positioning station at the end of is lateral movement. If a crate is disposed in the crate-positioning station and is accurately aligned to receive the bottles, the carrier immediately moves downwardly to deposit the bottles in the crate. With the spring plates 492 and 494 tending to urge the outer rows of bottles inwardly, the bases of the bottles are guided between the opposed walls 474 and 476 and between the stacking ears. As the bottles reach the position shown in Fig. 9, their curved bases, indicated at 502, engage the rounded upper edges of the upper grid element 482 and as the carrier continues to move downwardly, the bottles enter into crate cells. The lower edges of the spring plates 492 and 494 also enter the crate as shown in the dotted outline in Fig. 9.

Continued downward movement of the carrier moves the bases of the bottles through the openings 488 in the grid 484, and when the bottles are just above the supporting wires 490, control means, hereinafter described, serve to open the bottle-gripping bars and release the bottles in the crate and thereafter the carrier reverses its movement and returns to its position at the bottle-indexing station ready to deposit another caseload of bottles.

*Crate stop mechanism*

In order to prevent a pile-up of crates at the crate-positioning station which would interfere with the proper operation of the crate-elevating mechanism, a crate stop is provided as shown in Figs. 2, 5, and 6 at 504. Referring particularly to Figs. 5 and 6, the crate stop includes a fluid pressure cylinder 506 which is bolted as at 508 to a pair of plates 510 welded to the underside of conveyor chain channel 372. A piston rod 512 of the cylinder is connected to a member 514 through which extends a pin 516, at the outer ends of which are link arms 518. Each link arm is bifurcated, and pivotally connected as at 520 to a pivotally mounted crate-engaging dog 522. Each dog is pivotally supported upon one end of pin 524 which is supported by a member 526 bolted as at 528 to an L-shaped hanger 530 which is welded to the underside of conveyor chain channel 372. Upon pressurization of cylinder 506 at one end, the piston rod 512 is extended to raise the dogs to the position shown in Fig. 5, while pressurization of the opposite end of cylinder 506 will pivot the dogs downwardly such that a crate may pass thereover. When an abutting succession of crates are being fed by conveyor 376, the dogs 522 will engage the inside edge of the rear wall 480 of that crate immediately following the one in the crate-positioning station, to prevent further movement of the crate until the one in the station is lowered to the conveyor by the bars and permitted to move out of the station on the conveyor.

*Operation and control circuits*

The operation of the machine will be described in conjunction with the electric and hydraulic control circuits diagrammatically shown in Figs. 13 and 14 as well as the location and arrangements of the various electric limit switches, some of which have been heretofore mentioned. The electric switches, relays, and valves herein shown are of conventional construction. Referring first to Fig. 14, the various fluid pressure cylinders heretofore mentioned are shown connected to the fluid pressure pump 34 by pressure and exhaust lines. Two pressure lines 532 and 534 are shown. One may be a higher pressure line than the other so that the action of the fluid pressure cylinders will be of a correspondingly different speed and holding power. The exhaust line leading from all the cylinders and the rotary fluid motor back to the fluid reservoir is indicated at 536.

The schematic wiring diagram of Fig. 13 shows a step down transformer 540 to reduce 220 v. to 110 v. The pump motor 32 may be connected in the 220 v. circuit with a suitable switch provided to control its operation. An off-on switch 542 may be provided for the 110 v. control circuit. To start the machine, the switch 542 is closed to energize leads 544 and 546.

In the operation of the machine, the bottles leaving the last operation preparatory to deposit in the crates enter the machine on a single-line conveyor in the direction of the arrow 54 in Fig. 2 and move in single file across the platform 56. When three bottles are received on the platform, the leading bottle engages the actuating lever 58 of electric switch LS–1, closing the switch, and energizing valve solenoid 548, to open valve $V_1$ to admit fluid pressure to the lower end of cylinder 70, as shown in Figs. 1, 13, and 14. Thereupon the ram 64 is shifted across the platform urging the three bottles onto the triform conveyor belts 44a, 44b and 44c. As the bottles are urged onto the belts, they ride free of lever 58, releasing the lever and permitting it to pivot outward slightly, thereby opening switch LS–1. Valve $V_1$ is thereupon actuated by a built-in spring to reverse the fluid pressure flow into cylinder 70, to return the ram to the starting position. The next three bottles in a similar fashion follow these three after the ram 64 has returned to its initial position. In such fashion bottles are continuously fed to the triform conveyor 44.

The bottles move on the conveyor 44 toward the bottle-indexing station and are urged across the plate 150, shown in Fig. 12, and onto the bottle-supporting platform 112. When the platform 112 is filled with a caseload of bottles, the leading three bottles $B_d$ which first entered the indexing station are urged against the plungers 166 of limit switches LS–6, LS–7 and LS–8 to depress the plungers with the bottles finally coming to rest against the back stop 206. Upon depression of the plungers, the switches LS–6, LS–7 and LS–8 are closed, serving to energize, as shown in Fig. 13, a time delay relay TD and relay solenoid G. Relay solenoid G closes its switch $GR_1$ and opens $GR_2$, which in turn energizes valve solenoid 550 and de-energizes valve solenoid 552, thereby shifting valve $V_5$ to admit fluid pressure to the left end of cylinder 262 as viewed in Figs. 9 and 14 to effect gripping of the bottles by the gripping bars 210, 212, 214, 216, 218 and 220.

When the bottles have been gripped by the bars the time interval of the time delay relay expires closing relay switch TDR and causing energization of relay solenoid F. With F energized, switches $FR_1$ and $FR_2$ are respectively closed and opened, energizing valve solenoid 554 and de-energizing valve solenoid 556, and thereby effecting a shifting of valve $V_6$ to admit fluid pressure to the lower end of cylinder 130 to drop table 112. When table 112 drops away from beneath the bottles they are suspended by the bottle-gripping bars in the bottle-indexing station, and the spring plates 492 and 494 tension the outside rows of bottles inwardly.

At the time that the table 112 is dropped, the switches LS–6, LS–7 and LS–8 are retracted, and the bottle fence 154 is raised to prevent bottles remaining on the triform conveyor 44 from interfering with the transfer of the gripped bottles out of the indexing station, and to prevent entry of the bottles on the conveyor into the indexing station until the empty bottle carrier has returned to the indexing station.

As the table 112 drops, pin 122, shown in Fig. 12, engages the roller 558 on switch LS–11 actuating arm 560. Switch LS–11 is mounted on the frame 30 of the machine in any convenient manner. The movement of arm 560 by the pin 122 closes switch LS–11 to energize relay solenoid C as shown in Fig. 13. The relay switch GR₄ was closed when its solenoid G was energized by the closing of switches LS–6, LS–7, and LS–8. With solenoid C energized, switches CR₁ and CR₂ are respectively closed and opened to energize valve solenoid 562 and de-energize valve solenoid 564, which in turn shift valve V₇ to admit fluid pressure to cylinder 250 to draw the carrier out of the bottle-indexing station and position it over the crate-positioning station.

When the carrier has fully entered the carriage guideways 228 and 230, electric switch LS–5, mounted upon the carriage as shown in Fig. 3, is closed by the adjustable pin 258, mounted on the carrier, striking the roller on the end of switch arm 566. Upon closing switch LS–5, relay solenoid T is energized, closing switch TR₁ and opening switch TR₂. The bottle carrier is now ready to descend to deposit a caseload of bottles in a crate, provided a crate has entered the crate-positioning station and is supported in proper position to receive the bottles.

Figure 7:
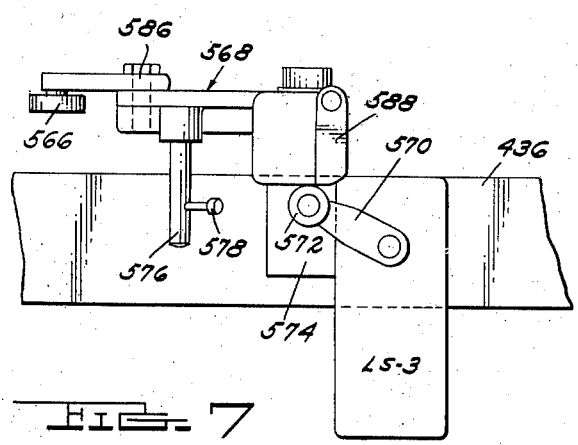
Fig. 7 (Sheet 7) is a side view of a crate actuated switch LS-3 taken along the line 7—7 of Fig. 6.

The crates enter the machine one after another on the crate conveyor 356. The crates rest upon the conveyor chain 376 and are guided during movement by the guide walls 360 of the crate conveyor. The leading crate, moving in the direction of the arrow in Fig. 5, enters the crate-positioning station and abuts the roller 566 on switch arm 568 of electric switch LS–3. Switch LS–3 is shown in Fig. 7 as well as in Figs. 5 and 6. It is mounted in any convenient manner upon a plate 436 which is secured at opposite ends to the frame members 30 as shown in Fig. 5. The switch is provided, in the conventional manner, with a switch arm 570 having a roller 572 at its outer end. Mounted upon member 436 adjacent switch LS–3 is a member 574 provided with an upstanding pin 576 upon which is swingably mounted the actuating arm 568. The actuating arm is provided with a depending portion 576 through which is threaded a bolt or the like 578 adapted to limit the swinging movement of arm 568 inwardly toward the crate-positioning station. A light coil spring 580 is connected to the arm 568 and to the member 436 to urge the arm 568 inwardly toward the crate-positioning station. Arm 568 may be formed of two portions 582 and 584 which are adjustably connected together by means of a bolt or the like 586.

When the crate abuts roller 566, it pivots arms 568 to carry a camming portion 588 over roller 572 to pivot switch arm 570 downwardly as viewed in Fig. 7 to close switch LS–3. Upon closing of switch LS–3, relay solenoid I, shown in Fig. 13, is energized, which in turn opens relay switch IR₁ and closes relay switch IR₂, which in turn serve to de-energize valve solenoid 590 and energize valve solenoid 592 to shift fluid pressure valve V₃ to admit fluid pressure to the right-hand end of fluid pressure cylinder 378 which, as a result, raises the crate-elevating bars 406 and 408. As the bars rise, they raise the crate off of conveyor chain 376 and shift the crate forwardly and upwardly such that the stacking ears thereof engage the notches in the crate-positioning elements 458.

When the crate has been fully elevated, the upper edge engages the roller 592 on switch arm 440 to close electric switch LS–15. Switch LS–15 is shown in Figs. 6, 8, and 13 and is mounted on the frame in any convenient manner such as shown in Fig. 8, with its arm 440 extending outwardly through the notch 442. Upon closure of LS–15, valve solenoid 594 is energized, which shifts fluid pressure valve V₄ to admit fluid pressure to the upper end of fluid pressure cylinder 338 to move the yoke 334 shown in Fig. 8, downwardly, thereby lowering the bottle carriage and bottle carrier supported thereby toward the crate resting on the crate-supporting bars 406 and 408. LS–15 is not closed until the crate resting on the crate-elevating bars has been fully elevated to its bottle-receiving position and therefore the bottle carrier does not descend until the crate has been properly positioned to receive the bottles. When relay switch TR₁ is closed and relay switch TR₂ is opened, by the energization of relay solenoid T, valve solenoid 596 is de-energized, which permits the shifting of valve V₄ when switch LS–15 is closed.

An electric switch LS–2, shown in Figs. 5 and 6, is disposed such that the roller 606 on the end of switch-actuating arm 608 is released upon raising of the crate-elevating bars 406 and 408. Roller 606 abuts arm 98 as shown in Figs. 5 and 6. The switch is mounted on a plate 610, which is secured in any convenient fashion to the frame 30 of the machine. Upon release of arm 608, switch LS–2 is opened, which, as shown in Fig. 13, serves to de-energize valve solenoid 612, permitting a built-in spring to shift fluid pressure valve V₂ to admit fluid pressure to the right-hand end of fluid pressure cylinder 506 to raise the crate dogs 522 to stop crate $C_b$ immediately following crate $C_a$ disposed over the crate-elevating bars. It is unnecessary for the crate resting on the crate-elevating bars to be raised to its bottle-receiving position before switch LS–2 is opened. In such fashion those crates following the crate disposed in the bottle-receiving position are withheld against further travel and interference with the crate disposed in the bottle-receiving position.

Mounted on the frame 30 in any convenient manner and in the position shown in Fig. 8 is an electric switch LS–9 having a switch arm 614 provided at its outer end with a roller 616. LS–9 is a normally closed switch adapted to be opened upon depression of arm 614 by a trip pin 618 threaded through an ear 620 of yoke 334. The pin may be provided with a lock nut 622 to lock it in determined adjusted positions. As the bottle carrier moves downwardly and the bottles enter the crate cells, pin 618 approaches roller 616. Pin 618 is so adjusted that when the bases of the bottles have approached within substantially one-quarter inch of the floor wires 490 of the crate, the pin strikes roller 616 and shifts arm 614 to open switch LS–9. Upon opening of switch LS–9, time delay solenoid TD is de-energized as well as relay solenoid G. Thereupon the time delay relay switch TDR and the relay switches GR₁, GR₃, and GR₄ are opened and relay switch GR₂ is closed. This serves to de-energize valve solenoid 550 and energize valve solenoid 552 to shift fluid pressure valve V₅ to admit fluid pressure to the left-hand end of the fluid pressure cylinder 262 on the bottle carrier, as viewed in Fig. 9, to cause the bottle-gripping bars to open and release the bottles into the crate. When relay switch GR₃ is open, relay solenoid T is de-energized, causing relay switches TR₁ and TR₂ to respectively open and close, thereby de-energizing valve solenoid 594 and energizing valve solenoid 596 to shift fluid pressure valve V₄ to cause admission of fluid pressure to the lower end of fluid pressure cylinder 338 to reverse the direction of movement of yoke 334 to raise the carrier away from the crate.

With the carriage rising, when it nears the upper limit of travel, a switch trip ear 624 momentarily engages the semicircular roller 626 mounted on the switch arm 628 of electric switch LS–4 to momentarily open the switch. Momentary opening of LS–4, see Fig. 13, will serve to deenergize relay solenoid I, thereby opening relay switch IR–2 and closing switch IR–1. Closing of switch IR–1 serves to energize valve solenoid 590 to shift the fluid pressure valve V₃ to admit fluid pressure to the left-hand end of fluid pressure cylinder 378 to cause a lowering of the crate-supporting bars 406 and 408 to lower the crate $C_a$ supported thereupon to the crate conveyor 376, which thereupon carries the crate out of the crate-positioning station. As arm 398 swings downwardly, it engages roller 606 to trip switch LS–2, closing same to energize valve solenoid 612 to shift valve V₂ to admit fluid pressure to the left-hand end of cylinder 506, causing a lowering of the crate stop dogs 522, thereby permitting the next crate, $C_b$, to enter the crate-positioning station.

When the carriage 330 reaches its upper limit of travel, a switch trip pin 630, threaded through the carriage as shown in Fig. 4 and adjustably locked in position by a lock nut 632, strikes the roller 634 on the end of switch-actuating arm 636 to open one side of switch LS-12 and close the other side as shown in Fig. 13. Upon closing switch LS-12, valve solenoid 564 is energized through line 638 and with the relay switch $CR_1$ having been theretofore opened by the action of LS-9 being opened, valve $V_7$ is shifted to admit fluid pressure to the right-hand end of cylinder 250 as shown in Fig. 14 to shift the carrier through the guideways of the carriage and into guideways 224 and 226 of the bottle-indexing station to return the carrier to the bottle-receiving position in the indexing station. As the carrier reaches its limit of lateral travel into the indexing station, the leading edge thereof strikes the roller 640 of switch-actuating arm 642, as shown in Fig. 3, to open switch LS-10, see Fig. 13, and effect de-energization of relay solenoid F, which in turn closes relay switch $FR_1$ and opens relay switch $FR_2$ to energize valve solenoid 554 and de-energize valve solenoid 556 to shift valve $V_6$ to a position admitting fluid pressure to the upper end of cylinder 130 to lower the bottle fence 154 and raise the bottle-supporting table 112. Thereupon the machine is ready to recycle when the next caseload of bottles enters the bottle-indexing station.

*Crate reject mechanism*

Control means are provided for preventing the deposit of bottles in the event that one or more bottles will not be received properly by a crate in the crate-positioning station. The bottles may be prevented from properly seating in a bottle crate because either one or more of the crate cells is so badly deformed that a bottle will not be received therewithin, or the crate may be improperly positioned to receive the bottles even though the switch LS-15 has been closed, or an obstruction may reside in one or more of the crate cells such as a bottle which has not been removed, or a broken bottle. With the occurrence of any of these eventualities, it may be desirable to withhold the deposit of the bottles so the defective crate may be passed out of the machine for removal from the line of crates. It is also necessary to ensure that the crateload of bottles being deposited by the bottle carrier are not broken by striking the obstacles in the crate during downward movement of the bottle carrier. To remedy these defects and to provide for satisfactory operation of the bottle deposit mechanism, the control circuit of the machine includes a pair of electric switches LS-13 and LS-14. Switch LS-13 serves to reverse the movement of the yoke to raise the bottle carrier in the event that one or more of the bottles suspended therefrom strikes obstacles in the crate which would prevent the proper seating of bottles therewithin. Switch LS-14 is a secondary bottle release switch which will serve to effect a release of the bottles into the crate even though there is an obstruction in the crate if the bottles have entered the crate cells a determined distance. Such determined distance may be where the bases of the bottles have passed below the upper grid 482 before one or more of them strikes the obstacles in the crate. If the bottles have entered the crate this far, then they will not fall out of the crate thereafter when the crate moves out of the machine and consequently the insertion of the bottles in the crate, while not satisfactory, is at least sufficient to permit the crate to be discharged from the machine with the bottles in it for later manual seating of any improperly seated bottles. The lower crate grid 484 may be bent or for some other reason the bases of the bottles may not enter the openings 488 in the lower grid though they have entered the openings 486 in the upper grid and it may require only a slight manual shifting of one or more of the bottles to seat all of them properly in the crate. It is to overcome this eventuality, as well as the possibility of other kinds of obstructions, that switch LS-14 is provided.

Switch LS-13 is shown as being mounted upon the bottle carriage in Figs. 3 and 4, in any convenient manner. The switch is provided with an actuating arm 644 having the conventional roller at the outer end 646 which is adapted to abut the trip pin 650 threaded through a laterally projecting ear 652 of the yoke. LS-13 is shown in Fig. 13 as being a normally open switch which, upon closure, will energize relay solenoid R to effect a closing of the normally open relay switch $RR_1$. Switch LS-13 is closed in the event that the base of a bottle suspended from the carrier strikes an obstruction in the crate as heretofore mentioned which interrupts continued downward movement of the carriage 320. When the downward movement of carriage 320 is interrupted by a bottle striking an obstruction in a crate, the yoke 334 continues to move downwardly carrying switch trip pin 650 with it and away from the roller 648 of switch LS-13. Trip pin 650 is so adjusted that only a very slight relative movement between the yoke and the carriage will effect a closure of switch LS-13. Momentary closure of LS-13, energizing relay solenoid R, closes, as heretofore mentioned, solenoid switch $RR_1$, and also effects opening of relay switch $RR_2$ shown in Fig. 13. Upon opening of switch $RR_2$, relay solenoid T is de-energized, which effects an opening of relay switch TR-1 and a closing of switch TR-2. Closure of switch TR-2 energizes valve solenoid 596 to shift valve $V_4$ to admit fluid pressure to the lower end of fluid pressure cylinder 338 to reverse the direction of movement of yoke 334 to raise the carriage and consequently the bottle carrier and the bottles suspended therefrom.

When the carriage reaches its upper limit of travel, switch LS-4 is tripped as heretofore mentioned to effect a lowering of the crate to the crate conveyor so that the crate will be passed on out of the machine. However, a closing of LS-12, see Figs. 4 and 13, will not energize solenoid 564 to shift valve $V_7$ to return the carrier to the indexing station because relay switch $GR_2$ is open. Switch $GR_2$ is open because switch $GR_4$ is still closed, not have been opened by the actuation of switch LS-9, which would ordinarily have been tripped when the carriage reached its lowermost position of travel. However, the carrier would be returned to the indexing station if the bottles had been released by a tripping of LS-14, as will be observed in Fig. 13. If LS-14 had been tripped, the bottles would have been released into the crate and the carrier would be empty when it reached its uppermost limit of travel.

Switch LS-14 is mounted on the frame of the machine as shown in Figs. 4 and 8. The switch is provided with an actuating arm 56 having a semi-circular roller 658 on the outer end thereof. An arm 660 is secured as at 662 to the yoke 334 to depend therefrom. The arm 660 is provided with a laterally extending trip pin 664, which will abut roller 658 to open switch LS-14 during upward movement of the yoke. During downward movement of the yoke, the pin 664 brushes past roller 658 without shifting arm 656, but upon upward movement will pivot arm 666 to open switch LS-14. The position of LS-14 on the frame of the machine and in response the position of pin 664 below the yoke is such that switch LS-14 will be momentarily opened if the bottles suspended from the carrier have entered below the openings in the upper grid 482 of the crate after the yoke has started upward because of the tripping of reject switch LS-13. Upon the opening LS-14 relay solenoid G is momentarily de-energized, opening relay switches $GR_1$, $GR_3$, and $GR_4$ while closing relay switch $GR_2$. This will serve to shift valve $V_5$ to a position to admit fluid pressure to the right-hand end of cylinder 262 to cause an opening of the bottle-gripping bars and the release of the bottles into the crate. The opening and closing of such relay switches will also permit, as may be determined from a study of Fig. 13, a return of the bottle carrier to the bottle-indexing station, the lowering of the crate-supporting bars to release the crate onto the crate conveyor, a raising of the bottle table 112 and a lowering of the bottle fence such that the machine is ready to re-cycle.

What I claim is:

1. A bottle-handling machine comprising, in combination: a crate-supporting station, a bottle-supporting station, means operable between the stations to transfer bottles from the bottle-supporting station to a crate in the crate-supporting station, said means including a yieldably supported bottle carrier yieldable under resistance to movement of a bottle carried thereby improperly seating in a crate, mechanism coupled with said means and responsive to yielding movement of the carrier to cause said means to withdraw such improperly seated bottle from the crate.

2. A bottle-handling machine comprising, in combination: a crate-supporting station, a bottle-supporting station, means operable between the stations to transfer bottles from the bottle-supporting station to a crate in the crate-supporting station, said means including a yieldably supported portion adapted to engage a bottle to be transferred by said means and yieldable under the urging of a bottle improperly seating in a crate, mechanism coupled with said means and said portion and responsive to yielding movement of such portion to cause said means to withdraw an improperly seated bottle from the crate.

3. A bottle-handling machine comprising, in combination: a crate-supporting station, a bottle-supporting station, a shiftable bottle carrier operable to engage a plurality of bottles at the bottle-supporting station and transfer them to a crate in the crate-supporting station, means shiftable toward and away from the crate-supporting station and operable to support the carrier for shiftable movement toward and away from a crate in the crate-supporting station, said carrier and means shiftable relative to each other in response to a bottle improperly seating in a crate during shifting of said means toward the crate-supporting station, and control mechanism responsive to said relative shifting between the carrier and means to cause said means to shift the carrier away from the crate-supporting station.

4. A bottle-handling machine comprising, in combination: a crate-supporting station, a bottle-supporting station spaced vertically above and laterally offset the crate-supporting station, a shiftable bottle carrier operable to grip a plurality of bottles in the bottle-supporting station and shift them laterally to a position spaced above the crate-supporting station, means operable to receive the carrier during laterally shiftable movement to said position over the crate-supporting station and support the carrier above such station, said means being shiftable vertically toward and away from a crate in the crate-supporting station to carry the carrier toward and away from a crate in such station, said carrier so supported by said means as to be shiftable relative thereto if a bottle engaged by the carrier improperly seats in a crate during downward movement of said means, and mechanism responsive to such relative movement between said means and carrier to reverse the movement of said means and raise the carrier away from the crate.

5. A bottle-handling machine comprising, in combination: a crate-supporting station, a bottle-supporting station spaced vertically above and laterally offset the crate-supporting station, guideway means spaced above said stations and extending therebetween, that portion of said guideway means disposed above the crate-supporting station vertically shiftable toward and away from such station, a bottle carrier for gripping a plurality of bottles in the bottle-supporting station and suspending them for transfer to a crate in the crate supporting station, said carrier supported in the guideway means for shiftable movement between the stations and for vertical movement with that portion of such means disposed above the crate-supporting station, power means coupled with the vertically shiftable portion of the guideway means to raise and lower the same, said coupling between the power means and said portion of the guideway means permitting relative shiftable movement therebetween during lowering of said portion if downward movement thereof is interrupted by a bottle suspended from the carrier improperly entering a crate in the crate-supporting station, and control mechanism responsive to such relative shifting between the power means and said portion of the guideway means to cause the power means to reverse its movement and elevate said portion of the guideway means and the carrier supported thereby away from the crate-supporting station.

6. In a bottle handling machine: a crate-supporting station, a bottle accumulating station spaced laterally from and vertically above the crate-supporting station, a bottle conveyor for delivering bottles to the accumulating station, a bottle carrier supported for laterally shiftable movement from a position above the accumulating station to a position above the crate-supporting station, a plurality of upright posts, a carriage supported on the posts for vertically shiftable movement above the crate-supporting station and operable to receive the carrier during its laterally shiftable movement to support the same for vertical movement above the crate-supporting station, power means having a vertically shiftable part acting against the underside of the carriage to raise and lower the same, said part and carriage shiftable relative to each other during downward movement of said part and carriage when a bottle suspended from the carrier improperly enters a crate, and control means responsive to relative shifting between said part and carriage to reverse the direction of movement of the power means to raise the carriage and carrier supported thereby away from a crate in the crate-supporting station.

7. A bottle-handling machine comprising, in combination: a crate conveyor; a bottle conveyor; a crate elevator disposed beneath the crate conveyor and operable to raise a crate from such conveyor and position it to receive bottles; said bottle conveyor including a bottle-accumulating station; means operable to transfer bottles from said station to a crate on the elevator; said means responsive to the pressure of a bottle improperly seating in a crate on the elevator to withdraw the improperly seated bottle from the crate and cause the elevator to lower the crate to the crate conveyor; crate stop means disposed along the crate conveyor ahead of the elevator and shiftable into the path of travel of that crate next following the crate disposed over the elevator in response to the elevation of the elevator, and shiftable out of the path of travel of such next succeeding crate upon lowering of the elevator.

8. In a bottle-handling machine having bottle transfer means for transferring groups of bottles from a bottle-indexing station to each of a succession of crates: a crate conveyor, a crate elevator for raising successive crates from the conveyor, crate-positioning means mounted for yieldable movement and against which the upper edge of a crate is urged when raised by said elevator, and said crate elevator provided with crate-locating means engaging a lower edge of a crate on the elevator and cooperating with the crate-positioning means to yieldingly hold a crate raised by the elevator in proper position to receive bottles from the transfer means.

9. The invention as defined in claim numbered 8 characterized in that the crate-locating means of the elevator is yieldingly mounted on the elevator to yield to the pressure of a crate urged against the crate-positioning means.

10. In a bottle-handling machine having a bottle carrier for transferring bottles from a bottle-accumulating station to a succession of crates, a bottle conveyor disposed to deliver bottles to said station, means responsive to the presence of a determined number of bottles in the station to cause said bottle carrier to transfer the bottles out of the station toward an awaiting crate, said means shiftable to an inoperative position out of the path of travel of bottles when the same are transferred to an awaiting crate by the carrier and shiftable to an operative position when the carrier returns to the station.

11. A bottle-handling machine comprising: a bottle supporting station; a crate supporting station; a bottle carrier means; moving means operably connected to said bottle carrier means for moving said carrier means through a predetermined cycle of movement between the stations to transfer a bottle from the bottle supporting station to a crate in the crate supporting station; and control means operably coupled to said moving means and responsive to the pressure of a bottle improperly seating in a crate in the crate supporting station to interrupt said predetermined cycle of movement and cause said moving means to reverse the predetermined cycling movement of said bottle carrier to withdraw the bottle from contact with the crate.

12. A bottle-handling machine comprising: a bottle supporting station; a crate supporting station; a bottle carrier means; moving means operably connected to said bottle carrier means for moving said carrier means through a predetermined cycle of movement between the stations to transfer a bottle from the bottle supporting station to a crate in the crate supporting station; and control means operably coupled to said moving means and responsive to the pressure of a bottle improperly seating in a crate in the crate supporting station to release the bottle into the crate if the bottle has entered the crate a determined distance, said control means when said bottle has not entered the crate said determined distance being responsive to the pressure of a bottle improperly seating in a crate in the crate supporting station to interrupt said predetermined cycle of movement and cause said moving means to reverse the predetermined cycling movement of said bottle carrier to withdraw the bottle from contact with the crate.

13. A bottle-handling machine comprising, in combination: a crate-supporting station, a bottle-supporting station spaced vertically above and laterally offset the crate-supporting station, guideway means spaced above said stations and extending therebetween, that portion of said guideway means disposed above the crate-supporting station vertically shiftable toward and away from such station, a bottle carrier for gripping a plurality of bottles in the bottle-supporting station and suspending them for transfer to a crate in the crate supporting station, said carrier supported in the guideway means for shiftable movement between the stations and for vertical movement with that portion of such means disposed above the crate-supporting station, power means coupled with the vertically shiftable portion of the guideway means to raise and lower the same through a predetermined cycle of movement, the coupling between the power means and said portion of the guideway means permitting relative shiftable movement therebetween during lowering of said portion if downward movement thereof is interrupted by a bottle suspended from the carrier improperly entering a crate in the crate-supporting station, and control mechanism responsive to such relative shifting between the power means and said portion of the guideway means to interrupt said predetermined cycle of movement and cause said power means to reverse the predetermined cycling movement of said bottle carrier to withdraw the bottle from contact with the crate.

14. A bottle handling machine as defined in claim 11 and wherein said moving means is operably connected to said bottle carrier in a yieldable manner to allow relative shiftable movement therebetween when a bottle is improperly seated, the responsiveness of said control means being effected through said relative shiftable movement.

15. A bottle handling machine as defined in claim 12 and wherein said moving means is operably connected to said bottle carrier in a yieldable manner to allow relative shiftable movement therebetween when a bottle is improperly seated, the responsiveness of said control means being effected through said relative shiftable movement.

References Cited in the file of this patent

UNITED STATES PATENTS

| Number | Name | Date |
| --- | --- | --- |
| 2,219,827 | Kimball | Oct. 29, 1940 |
| 2,610,746 | Steck | Sept. 16, 1952 |
| 2,643,043 | Okulitch et al. | June 23, 1953 |
| 2,681,171 | Brown et al. | June 15, 1954 |
| 2,732,956 | Horner et al. | Jan. 31, 1956 |
| 2,823,946 | Okulitch et al. | Feb. 18, 1958 |

FOREIGN PATENTS

| Number | Country | Date |
| --- | --- | --- |
| 526,648 | Belgium | Mar. 15, 1954 |